United States Patent
Muramatsu et al.

(10) Patent No.: US 7,804,395 B2
(45) Date of Patent: Sep. 28, 2010

(54) MOBILE RADIO COMMUNICATION SYSTEM

(75) Inventors: Junya Muramatsu, Aichi-ken (JP); Satoshi Makido, Aichi-ken (JP); Junji Imai, Aichi-ken (JP); Kenji Ito, Aichi-ken (JP); Yukihiro Tadokoro, Aichi-ken (JP)

(73) Assignee: Kabushiki Kaisha Toyota Chuo, Aichi-Gun, Aichi-Ken (JP)

( * ) Notice: Subject to any disclaimer, the term of this patent is extended or adjusted under 35 U.S.C. 154(b) by 360 days.

(21) Appl. No.: 12/076,528

(22) Filed: Mar. 19, 2008

(65) Prior Publication Data
US 2009/0033518 A1 Feb. 5, 2009

(30) Foreign Application Priority Data
Mar. 20, 2007 (JP) .............................. 2007-073137

(51) Int. Cl.
*B60Q 1/00* (2006.01)

(52) U.S. Cl. ................. 340/435; 340/902; 340/903; 340/933; 340/939; 340/436; 701/201; 301/120; 342/29; 342/30; 342/65

(58) Field of Classification Search ................ 340/902, 340/903, 933, 939, 435, 436; 701/201; 301/120; 342/29, 30, 65
See application file for complete search history.

(56) References Cited

U.S. PATENT DOCUMENTS
2006/0149475 A1* 7/2006 Kellum et al. ............... 701/300

FOREIGN PATENT DOCUMENTS
JP  2001-36444   2/2001
JP  2006-107521  4/2006

* cited by examiner

*Primary Examiner*—Davetta W Goins
*Assistant Examiner*—Ojiako Nwugo
(74) *Attorney, Agent, or Firm*—McGinn IP Law Group, PLLC

(57) ABSTRACT

A mobile radio communication system estimates the positional relationship between an own moving terminal and another moving terminal around a view obstruction. If the absolute value of the difference between detected reception power levels is lower than a first power threshold value, the own moving terminal determines that the other moving terminal is positioned within the visual range of the own moving terminal, the distance from the own moving terminal to the other moving terminal being shorter than a predetermined distance $B_P$, or that the other moving terminal is positioned outside thereof, the distance to the visual range of the own moving terminal being shorter than the predetermined distance $B_P$. Also if the absolute value is higher than or equal to the first power threshold value, the own moving terminal determines in a similar manner.

9 Claims, 14 Drawing Sheets

TRANSMISSION SIGNAL (Fig. 7)

T = 200 ms

τ = 100 μs

MOBILE RADIO COMMUNICATION SYSTEM

BACKGROUND OF THE INVENTION

1. Field of the Invention

The present invention relates to a mobile radio communication system estimating the position of moving bodies, particularly, the positional relationship between an own moving terminal and another moving terminal. The present invention is useful for moving bodies running in an environment in which blind spots are likely to be caused due to, for example, buildings. The present invention is applicable to, for example, a safety assistance system to be provided to ensure traffic safety at, for example, a blind intersection.

2. Description of the Related Art

For example, a Japanese Unexamined Patent Application Publication No. 2006-107521 discloses a moving terminal communication apparatus. Such a communication apparatus transmits and receives the position and speed of a respective vehicle to and from other vehicles with communication devices performing dedicated short range communication (DSRC) and reception devices receiving signals from a global positioning systems (GPS). And the apparatus alerts the driver to the presence of another vehicle within a close range. In addition, a traffic safety system assisting safety driving is expected to be developed in recent years. The traffic safety system uses a vehicle-to-vehicle communication system including the moving terminal communication apparatuses mounted in vehicles to detect the position and speed of another approaching vehicle in order to estimate the risk of, for example, a head-on collision at an intersection and to indicate the estimated risk to the driver in advance.

However, in such DSRC technologies in related art, when another vehicle is positioned outside the visual range (in a blind spot) of the own vehicle because of the presence of a building or the like, the establishment of the DSRC between the vehicles, that is, the transfer of the position and speed of the own vehicle between the vehicles is likely to fail. Because the electromagnetic waves are drastically attenuated due to the diffraction of electromagnetic waves. For the same reason, it is not easy to ensure a sufficient communication distance between the own vehicle and another hidden vehicle. Accordingly, there is a problem in that the safety of the vehicles cannot be necessarily ensured sufficiently in the related art.

SUMMARY OF THE INVENTION

Accordingly, it is an object of the present invention to realize a communication system capable of reliably estimating the positional relationship of another moving terminal with respect to an own moving terminal even if the other moving terminal is outside the visual range of the own moving terminal.

In order to resolve the above problems, it is desirable to achieve the following aspects.

A first aspect of the present invention is a mobile radio communication system estimating the positional relationship between the own moving terminal and the other moving terminal around a view obstruction. The other moving terminal serves as a transmitting station in the mobile radio communication system and includes a transmission antenna having a predetermined transmission power level and a predetermined mounting height. The own moving terminal serves as a receiving station in the mobile radio communication system and includes two reception antennas having different mounting heights, the mounting height of one reception antenna being different from that of the other reception antenna by a certain value or higher; reception power level detecting means for detecting the reception power level of a signal transmitted from the transmission antenna of the other moving terminal for every reception antenna; and absolute value determining means for determining whether the absolute value of the difference between the detected reception power levels is lower than a first power threshold value. If the absolute value is lower than the first power threshold value, the own moving terminal determines that the other moving terminal is positioned within the visual range of the own moving terminal, the distance from the own moving terminal to the other moving terminal being shorter than a predetermined distance $B_P$, or that the other moving terminal is positioned outside the visual range of the own moving terminal, the distance to the visual range of the own moving terminal being shorter than the predetermined distance $B_P$. If the absolute value is higher than or equal to the first power threshold value, the own moving terminal determines that the other moving terminal is positioned within the visual range of the own moving terminal, the distance from the own moving terminal to the other moving terminal being longer than or equal to the predetermined distance $B_P$, or that the other moving terminal is positioned outside the visual range of the own moving terminal, the distance to the visual range of the own moving terminal being longer than or equal to the predetermined distance $B_P$.

However, for example, if the road on which the own moving terminal is running is orthogonal to the road on which the other moving terminal is running and the road on which the other moving terminal is running is blind near the intersection between the above roads, the distance to the visual range of the own moving terminal means the distance from the other moving terminal running in the blind spot of the own moving terminal to the intersection. In this case, it is assumed that the intersection is within the visual range of the own moving terminal.

The receiving station may include three or four antennas. It is possible to configure the mobile radio communication system according to the first aspect of the present invention as long as the receiving station has at least two reception antennas.

According to a second aspect of the present invention, the own moving terminal further includes selected value determining means for determining whether a value selected from the detected reception power levels is higher than or equal to a second power threshold value. If the absolute value is lower than the first power threshold value and the selected value is higher than or equal to the second power threshold value, the own moving terminal determines that the other moving terminal is positioned within the visual range of the own moving terminal, the distance from the own moving terminal to the other moving terminal being shorter than the predetermined distance $B_P$. If the absolute value is lower than the first power threshold value and the selected value is lower than the second power threshold value, the own moving terminal determines that the other moving terminal is positioned outside the visual range of the own moving terminal, the distance to the visual range of the own moving terminal being shorter than the predetermined distance $B_P$.

The criterion for selecting the value from the reception power levels may be arbitrarily set. The higher reception power level or the lower reception power level may be selected. Alternatively, the reception power level of either of the reception antennas may be constantly selected.

According to a third aspect of the present invention, the own moving terminal further includes alert means for issuing an alert message or an alert tone if the own moving terminal determines that the other moving terminal is positioned outside the visual range of the own moving terminal, the distance to the visual range of the own moving terminal being shorter than the predetermined distance $B_P$.

However, for example, if the distance from the own moving terminal to the intersection where an occurrence of any collision is estimated is longer than or equal to a predetermined threshold value, the alert means does not necessarily issue the alert message or the alert tone. Such a threshold value may be dynamically varied and controlled in accordance with, for example, the speed of the own moving terminal.

According to a fourth aspect of the present invention, the own moving terminal further includes distance measuring means for measuring the distance from the own moving terminal to an intersection ahead of the own moving terminal on the road on which the own moving terminal is running; function value calculating means for calculating the value of a power evaluation function used for estimating the reception power level at the intersection of the transmission signal which is supposed to be diffracted at the intersection on the basis of a selected value of the detected reception power levels, the distance from the own moving terminal to the intersection, and a predetermined attenuation characteristic of the diffracted electromagnetic wave; and function value determining means for determining whether the value of the power evaluation function is higher than or equal to a third power threshold value. If the absolute value is higher than or equal to the first power threshold value and the value of the power evaluation function is higher than or equal to the third power threshold value, the own moving terminal determines that the other moving terminal is positioned within the visual range of the own moving terminal, the distance from the own moving terminal to the other moving terminal being longer than or equal to the predetermined distance $B_P$. If the absolute value is higher than or equal to the first power threshold value and the value of the power evaluation function is lower than the third power threshold value, the own moving terminal determines that the other moving terminal is positioned outside the visual range of the own moving terminal, the distance to the visual range of the own moving terminal being longer than or equal to the predetermined distance $B_P$.

The distance measuring means may include a receiving unit that receives a signal from a GPS satellite, a calculating unit that calculates the current position (the longitude and latitude) of the own moving terminal from the received signal, and a storing unit that stores map information about the surroundings of the own moving terminal. Alternatively, an apparatus of measuring or estimating the distance to the intersection on the basis of information acquired from a camera or a laser radar may be adopted.

The selected value may be the reception power level of the reception antenna having the best reception state, the reception power level of another reception antenna, or the average of the reception power levels of all the reception antennas. The selected value of the reception power level may be determined on the basis of the reception characteristics specific to each reception antenna or the reliability of the reception states of the individual reception antennas (the reliability of the received information).

A fifth aspect of the present invention is a mobile radio communication system estimating the positional relationship between the own moving terminal and the other moving terminal around a view obstruction. The other moving terminal serves as a transmitting station in the mobile radio communication system and includes a transmission antenna having a predetermined transmission power level and a predetermined mounting height. The own moving terminal serves as a receiving station in the mobile radio communication system and includes three or more reception antennas having different mounting heights; reception power level detecting means for detecting the reception power level of a signal transmitted from the transmission antenna of the other moving terminal for every reception antenna; distance storing means for storing a predetermined distances $B_P$ corresponding to each of the reception antennas excluding at least the reception antenna having the highest mounting height; and absolute value determining means for selecting arbitrary two reception antennas from the three or more reception antennas to determine whether the absolute value of the difference between the reception power levels of the selected reception antennas is lower than a first power threshold value. If the absolute value is lower than the first power threshold value, the own moving terminal determines that the other moving terminal is positioned within the visual range of the own moving terminal, the distance from the own moving terminal to the other moving terminal being shorter than the predetermined distance $B_P$ corresponding to the reception antenna having the lower mounting height among the selected reception antennas, or that the other moving terminal is positioned outside the visual range of the own moving terminal, the distance to the visual range of the own moving terminal being shorter than the predetermined distance $B_P$. If the absolute value is higher than or equal to the first power threshold value, the own moving terminal determines that the other moving terminal is positioned within the visual range of the own moving terminal, the distance from the own moving terminal to the other moving terminal being longer than or equal to the predetermined distance $B_P$, or that the other moving terminal is positioned outside the visual range of the own moving terminal, the distance to the visual range of the own moving terminal being longer than or equal to the predetermined distance $B_P$.

Although it is necessary to set the difference in mounting height between the reception antenna having the highest mounting height and the reception antenna having the lowest mounting height to a value higher than the certain value (the lower limit) according to the first aspect of the present invention, the difference in mounting height is not necessarily set to the certain value or higher for a pair of reception antennas for which the difference in reception power level is not calculated. The predetermined distance $B_P$ corresponding to each reception antenna may be stored in a program or in a database accessible by the program.

According to a sixth aspect of the present invention, the own moving terminal further includes selected value determining means for determining whether a value selected from the detected reception power levels is higher than or equal to a second power threshold value. If the absolute value is lower than the first power threshold value and the selected value is higher than or equal to the second power threshold value, the own moving terminal determines that the other moving terminal is positioned within the visual range of the own moving terminal, the distance from the own moving terminal to the other moving terminal being shorter than the predetermined distance $B_P$ corresponding to the reception antenna having the lower mounting height among the selected two reception antennas. If the absolute value is lower than the first power threshold value and the selected value is lower than the second power threshold value, the own moving terminal determines that the other moving terminal is positioned outside the visual range of the own moving terminal, the distance to the visual range of the own moving terminal being shorter than the predetermined distance $B_P$.

According to a seventh aspect of the present invention, the own moving terminal further includes alert means for issuing an alert message or an alert tone if the own moving terminal determines that the other moving terminal is positioned outside the visual range of the own moving terminal, the distance to the visual range of the own moving terminal being shorter than the predetermined distance $B_P$ corresponding to the reception antenna having the lower mounting height among the selected two reception antennas.

According to an eighth aspect of the present invention, the own moving terminal further includes distance measuring means for measuring the distance from the own moving terminal to an intersection ahead of the own moving terminal on the road on which the own moving terminal is running; function value calculating means for calculating the value of a power evaluation function used for estimating the reception power level at the intersection of the transmission signal which is supposed to be diffracted at the intersection on the basis of a selected value of the detected reception power levels, the distance from the own moving terminal to the intersection, and a predetermined attenuation characteristic of the diffracted electromagnetic wave; and function value determining means for determining whether the value of the power evaluation function is higher than or equal to a third power threshold value. If the absolute value is higher than or equal to the first power threshold value and the value of the power evaluation function is higher than or equal to the third power threshold value, the own moving terminal determines that the other moving terminal is positioned within the visual range of the own moving terminal, the distance from the own moving terminal to the other moving terminal being longer than or equal to the predetermined distance $B_P$ corresponding to the reception antenna having the lower mounting height among the selected two reception antennas. If the absolute value is higher than or equal to the first power threshold value and the value of the power evaluation function is lower than the third power threshold value, the own moving terminal determines that the other moving terminal is positioned outside the visual range of the own moving terminal, the distance to the visual range of the own moving terminal being longer than or equal to the predetermined distance $B_P$.

According to a ninth aspect of the present invention, the own moving terminal includes the transmission antenna.

According to the above aspects of the present invention, it is possible to effectively or reasonably resolve the problems described above.

FIG. 1 is a graph showing experimental values of the reception power levels of two antennas having higher and lower mounting heights at which the antennas are mounted (the height at which an antenna is mounted is hereinafter referred to as a mounting height). In this experiment, the two antennas having the higher and lower mounting heights were arranged within the visual range of one transmitting antenna that has a predetermined output and that is positioned at the origin z=0 and a distance z between each receiving antenna and the transmitting antenna was continuously varied to measure the reception power level of each receiving antenna. The following measurement conditions were used in this experiment. However, the embodiments of the present invention are not restricted to the exemplary measurement conditions.

| (1) Mounting height of transmitting antenna: | 2.0 m |
| (2) Frequency of transmission signal: | 5.0 GHz |
| (3) Transmission power: | +10 dBm |
| (4) Mounting height of receiving antenna 1: | 1.8 m |
| (5) Mounting height of receiving antenna 2: | 0.5 m |

It is supposed that the transmission antenna is within the visual range of each reception antenna and the distance z between the corresponding moving bodies is longer than or equal to a predetermined distance $B_P$ (about 232 m in FIG. 1). In this case when the electromagnetic wave output from the transmission antenna is received by the reception antennas having different mounting height and the mounting height of one reception antenna differs from that of the other reception antenna by a certain value or higher, the two reception antennas differ in the reception power level by a predetermined value (a first power threshold value: about 9 dB in FIG. 1) or higher. If the distance between the moving bodies is shorter than the predetermined distance $B_P$ in the same conditions, the reception antennas do not differ in the reception power level by the predetermined value (first power threshold value) or higher.

The predetermined distance $B_P$ is determined on the basis of the height of the transmission antenna, the frequency of an electromagnetic wave that is transmitted, and the mounting heights of the reception antennas. The predetermined distance $B_P$ may be determined according to Equation (1) or may be empirically set to an appropriate value, for example, by the experiment described above.

$$B_P \cong 4(Ht \times Hr)/\lambda \quad (1)$$

where Ht denotes the mounting height of the transmission antenna at the transmitting station, Hr denotes the mounting height of the selected reception antenna at the receiving station or the mounting height of the reception antenna having the highest mounting height, and $\lambda$ denotes the wavelength of the electromagnetic wave transmitted from the transmission antenna. The certain value (the lower limit of the difference in mounting height) may be around 60 cm. The criteria for setting this certain value will be described in detail below.

The point ($z=B_P$) at which the reception antennas start to differ in the reception power level by the predetermined value (the first power threshold value) or higher due to the mounting heights of the reception antennas in the communication within the visual range is referred to as a deviation point. Although innumerable deviation points occur around the transmission antenna if no obstruction exists around the transmission antenna, it is sufficient to consider only the deviation points on the road because buildings normally stand along the road.

In contrast, it is supposed that the transmission antenna is outside the visual range (in the blind spot) of each reception antenna. In this case when the electromagnetic wave output from the transmission antenna is received by the reception antennas having different mounting height and the mounting height of one reception antenna differs from that of another reception antenna by a certain value or higher, the difference in reception power level depends on the distance x from the transmission antenna to the diffraction point (for example, a blind corner of an intersection) of the electromagnetic wave. FIG. 2 is a graph showing experimental values of the reception power levels of two antennas having higher and lower mounting heights in communication across the visual range. In the experiment in FIG. 2, the diffraction point (a blind intersection) was provided at a point apart from the transmission point by about 62 m and the communication across the visual range was performed on the road intersecting at a right angle at this intersection (z=x), that is, in a communication area (z≧x≅62 m) in the same conditions as in FIG. 1. In this case, when the distance from the transmission antenna to the diffraction point of the electromagnetic wave is shorter than the predetermined distance $B_P$ (x<$B_P$), the difference in reception power level between the reception antennas did not exceed the predetermined value (the first power threshold value) even if the distance between the transmission antenna and the reception antenna is increased. This is because, after the electromagnetic wave is diffracted due to a view obstruction, such as a corner at an intersection, the diffracted wave is propagated while being attenuated in accordance with a certain attenuation curve.

Similarly, since the same attenuation curve is applied to the diffracted wave also when the distance from the transmission antenna to the intersection is longer than or equal to the predetermined distance $B_P$ (about 232 m in FIG. 1), the difference in reception power level between the reception antennas exceeded the predetermined value (first power threshold value).

The determination result based on the threshold value may be adopted as an allowable result, for example, only if multiple similar observation and determination results are successively detected during a certain short time period in consideration of any noise or the like. Alternatively, a margin may be set for the threshold value in accordance with the estimated noise.

The first aspect of the present invention uses these propagation characteristics. In other words, according to the first aspect of the present invention, the absolute value determining means can be used to determine the following two states.

(State A) Another moving terminal is positioned within the visual range of the own moving terminal, the distance from the own moving terminal to the other moving terminal being shorter than the predetermined distance $B_P$, or is positioned outside the visual range of the own moving terminal, the distance to the visual range of the own moving terminal being shorter than the predetermined distance $B_P$.

(State B) Another moving terminal is positioned within the visual range of the own moving terminal, the distance from the own moving terminal to the other moving terminal being longer than or equal to the predetermined distance $B_P$, or is positioned outside the visual range of the own moving terminal, the distance to the visual range of the own moving terminal being longer than or equal to the predetermined distance $B_P$.

The state A is detected only if the absolute value determining means determines that the absolute value of the difference is lower than the first power threshold value while the state B is detected only if the absolute value determining means determines that the absolute value of the difference is higher than or equal to the first power threshold value.

The distance between the own moving terminal and the other moving terminal on the road on which the own moving terminal and the other moving terminal are running is assured to be longer than or equal to the predetermined distance $B_P$ in the state B. In contrast, the probability of the other moving terminal meeting the own moving terminal at the intersection in the state A is possibly higher than that in the state B. Accordingly, such a determination result can be used to estimate any risk between the moving bodies that are running.

Since the determination is based on the reception power level of the electromagnetic wave transmitted from the other moving terminal, it is possible to perform the determination even in the communication environment in which the communication (transmission and reception of meaningful data) between the moving bodies is likely to fail and which has a lower signal-to-noise (S/N) ratio. Accordingly, the determination can be performed even if the other moving terminal is in the blind spot of the own moving terminal and, therefore, it is possible to estimate the risk between the moving bodies that are running more accurately. For the same reason, even if the other moving terminal is far from the own moving terminal, it is possible to estimate the risk between the moving bodies that are running more accurately.

The effects and advantages of the second aspect of the present invention will now be described. Referring to FIG. 1, a line segment a indicates the lower limit of the reception power level of the reception antenna having the higher reception power level when z≦$B_P$ in the communication within the visual range. The limit value is around −78 dBm in the graph in FIG. 1. For example, the threshold value, such as the limit value in FIG. 1, is used as the second power threshold value. As apparent from FIG. 1, if the reception power level of the reception antenna having the higher reception power level is higher than or equal to the second power threshold value when the state A is detected, it can be determined that the communication within the visual range is performed.

In contrast, when the communication across the visual range is performed, as shown in FIG. 2, the reception power level of the reception antenna near the diffraction point is continuously and sharply attenuated with the increasing distance y (=z−x≧0) from the reception antenna to the intersection and, then, is steadily attenuated with the increasing distance z between the transmission antenna to the reception antenna. Accordingly, unless the reception operation is performed at close range of the diffraction point (normally within several meters), the reception power level is always lower than the second power threshold value even if the higher reception power level is selected. The determination result based on the threshold value may be adopted as an allowable result, for example, only if multiple similar observation and determination results are successively detected during a certain short time period in consideration of any noise or the like. Alternatively, a margin may be set for the threshold value in accordance with the estimated noise.

According to the second aspect of the present invention, it is possible to detect the following two positional relationships shown in FIG. 3.

(Positional relationship 1) Another moving terminal is positioned within the visual range of the own moving terminal, the distance z from the own moving terminal to the other moving terminal being shorter than the predetermined distance $B_P$.

(Positional relationship 2) Another moving terminal is positioned outside the visual range of the own moving terminal, the distance x to the visual range of the own moving terminal being shorter than the predetermined distance $B_P$.

Particularly, since the positional relationship 2 has a higher probability of the own moving terminal meeting the other moving terminal, such a determination result is very useful for the estimation of the risk between the moving bodies that are running. Accordingly, when the positional relationship 2 is detected, the third aspect of the present invention may be used to issue the alert message or the alert tone. Specifically, according to the third aspect of the present invention, if the state (the positional relationship) having a higher risk is detected, it is possible to indicate the higher risk to the driver of the own moving terminal with the alert message or the alert tone.

The effects and advantages of the fourth aspect of the present invention will now be described. In the following description, the distance from the transmission antenna to the diffraction point (intersection) is denoted by "x" and the distance from the diffraction point (intersection) to the reception antenna is denoted by "y". The relationship z=x+y is established where the distance from the transmission antenna to the reception antenna is denoted by "z". The distance y can be measured by the distance measuring means. Since the attenuation characteristics of the diffracted wave due to the view obstruction around the intersection are known, as shown in FIG. 2, it is possible to easily estimate the reception power level at the intersection of the transmission signal that is supposed to be diffracted at the intersection ahead of the reception antenna when the reception antenna receives the transmission signal from the transmission antenna. In other words, the power evaluation function can be easily generated. As described above, the diffracted wave is sharply attenuated particularly near the diffraction point. The reception power levels of the reception antennas having the higher and lower mounting heights are slowly attenuated when the distance z from the transmission antenna becomes longer than the one at the deviation point ($z=B_P$) in the communication within the visual range, as shown in FIG. 1.

Accordingly, if the distance y from the own moving terminal to the intersection (the diffraction point) is equal to several tens meters or longer when the reception power level of the reception antenna having the higher mounting height is selected as the selected value and the reception power level indicated by a line segment c in FIG. 1 is selected as the third power threshold value, the estimated value of the reception power level at the intersection of the transmission signal is greatly higher than the actual reception power level, thus exceeding the third power threshold value. The amount of increase can be expressed as a function of the distance y, $w(y) \cong a\, y^m$ ($\frac{1}{3} \leq m \leq \frac{1}{2}$, a coefficient a is a positive constant number) shown in FIG. 4, by inverse operation based on the attenuation characteristics shown in FIG. 2. Accordingly, the value of the function, that is, the estimated value of the reception power level at the intersection exceeds the third power threshold value in the communication within the visual range.

In contrast, in the communication across the visual range, the amount of attenuation of the electromagnetic wave caused by the diffraction at the intersection apart from the own moving terminal by the distance y is offset by the amount of increase w(y), so that the curve ($z > B_P$) of the reception power level of the reception antenna having the lower mounting height shown in FIG. 1 is overlapped with the estimated value. Accordingly, the estimated value does not exceed the third power threshold value (the level of the line segment c) at its maximum.

If the reception power level indicated by a line segment b in FIG. 1 is selected as the third power threshold value when the reception power level of the reception antenna having the higher mounting height is selected as the selected value, similar effects result in similar results. The determination result based on the threshold value may be adopted as an allowable result, for example, only if multiple similar observation and determination results are successively detected during a certain short time period in consideration of any noise or the like. Alternatively, a margin may be set for the threshold value in accordance with the estimated noise.

The function value determining means according to the fourth aspect of the present invention can be used in the above manner to determine either of the following positional relationships shown in FIG. 5 if the absolute value determining means determines that $z \geq B_P$.

(Positional relationship 3) Another moving terminal is positioned within the visual range of the own moving terminal, the distance z from the own moving terminal to the other moving terminal being longer than or equal to the predetermined distance $B_P$.

(Positional relationship 4) Another moving terminal is positioned outside the visual range of the own moving terminal, the distance x to the visual range of the own moving terminal being longer than or equal to the predetermined distance $B_P$.

According to any of the fifth to eighth aspects of the present invention, effects similar to the ones according to any of the first to fourth aspects of the present invention can be achieved for multiple deviation points. Specifically, according to any of the fifth to eighth aspects of the present invention, since multiple combinations of the reception power levels are used to calculate the absolute value of the difference, multiple deviation points appear between the transmitting station and the receiving station in accordance with the variation in the combination of two reception antennas (the selection of two reception antennas). Accordingly, the position of the other moving terminal with respect to the own moving terminal can be more accurately determined on the basis of the positional relationship between each deviation point and the own moving terminal or the other moving terminal.

Furthermore, according to the seventh aspect of the present invention, if the state (the positional relationship) having a higher risk is detected, it is possible to indicate the higher risk in detail to the driver of the own moving terminal in advance.

According to the ninth aspect of the present invention, the arbitrary moving terminal in the mobile radio communication system can serve as both the receiving station and the transmitting station, as needed. Accordingly, it is possible to realize the safety-oriented mobile radio communication system in which the moving bodies that are running mutually confirm the safety.

However, each moving terminal does not necessarily serve as both the receiving station and the transmitting station. For example, only special vehicles, such as ambulance cars, fire engines, and police cars, may serve as the transmitting stations and the remaining moving bodies may serve as the receiving stations in the mobile radio communication system.

DESCRIPTION OF THE PREFERRED EMBODIMENTS

Embodiments of the present invention will herein be described with reference to the attached drawings. The embodiments of the present invention are not restricted to the ones described below.

First Embodiment

Figure 6:
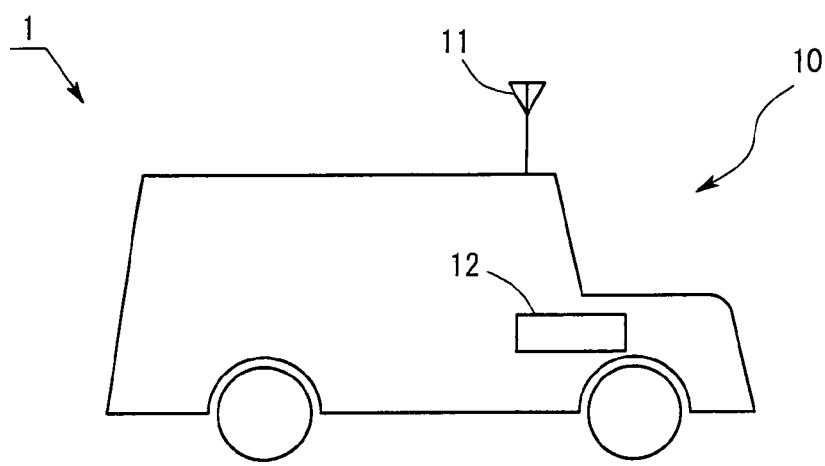
FIG. 6 illustrates an example of the dynamic configuration of a mobile radio communication system according to a first embodiment of the present invention.
Figure 6:
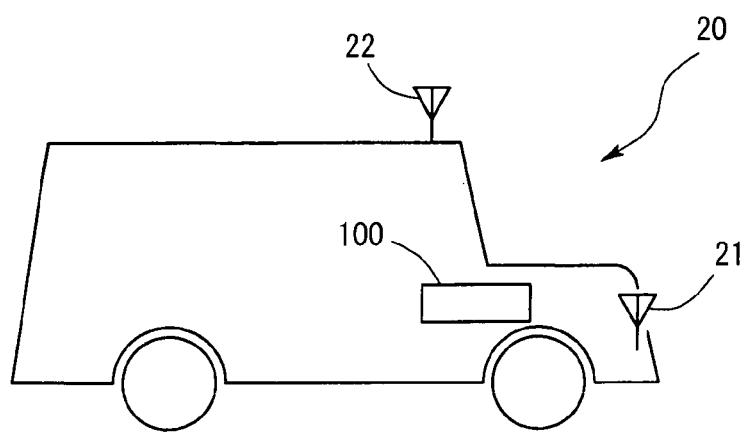

FIG. 6 illustrates an example of the dynamic configuration of a mobile radio communication system 1 according to a first embodiment of the present invention. The mobile radio communication system 1 includes at least one transmitting station 10 and at least one receiving station 20. These radio communication stations are mounted to moving bodies that freely move. A transmitting antenna 11 of the transmitting station 10 has a mounting height of 2.0 m and a transmission power of +10 dBm. Signals transmitted through the transmitting antenna 11 have a frequency of 5.0 GHz. A communication apparatus 12 in the transmitting station 10 controls the transmitting station 10 so as to output the transmission signals having a waveform shown in FIG. 7.

Figure 7:
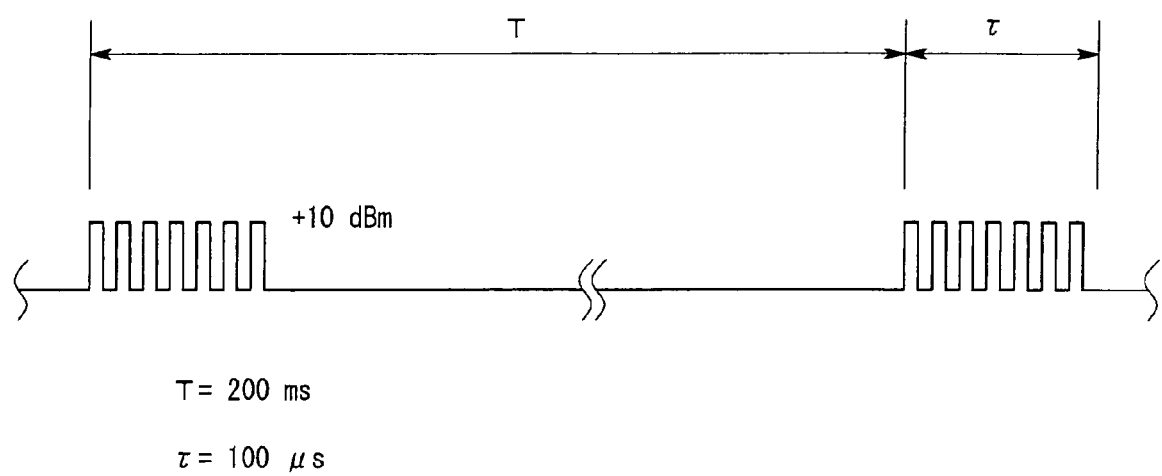
FIG. 7 is a graph showing an example of the waveform of a transmission signal output through a transmitting antenna.

FIG. 7 is a graph showing an example of the waveform of a transmission signal output through the transmitting antenna 11. The transmission signal is intermittently output on a cycle T=200 ms, and rectangular waves having a periodic envelope are output during a transmission period $\tau$=100 μs that periodically appears for every cycle. Although the period T of the transmission signal is always constant in each transmitting station 10 in the mobile radio communication system 1, the transmission period $\tau$ is arranged at random in the period T by each transmitting station 10 from the view of the receiving station 20 because the starting time of the period T is arbitrarily set. Accordingly, the probability of the transmission signals that are output through the transmitting antennas 11 of different two transmitting stations and that are concurrently received is very low and, therefore, it can be considered that exclusive transmission is basically realized. Consequently, it is possible to identify the transmitting station 10 on the basis of the remainder of a division of the reception time of the transmission signal by the period T in the receiving station 20. Specifically, if T/$\tau$ is set to a larger value sufficient to determine each moving terminal and 1/T is set to a higher frequency sufficient to individually monitor other moving bodies (transmitting stations), the own moving terminal (the receiving station) can identify each transmitting station (another moving terminal) to continuously monitor the rough position of the transmitting station. The communication apparatus 12 in FIG. 6 has the transmission signal generating and outputting means described above.

Figure 8:
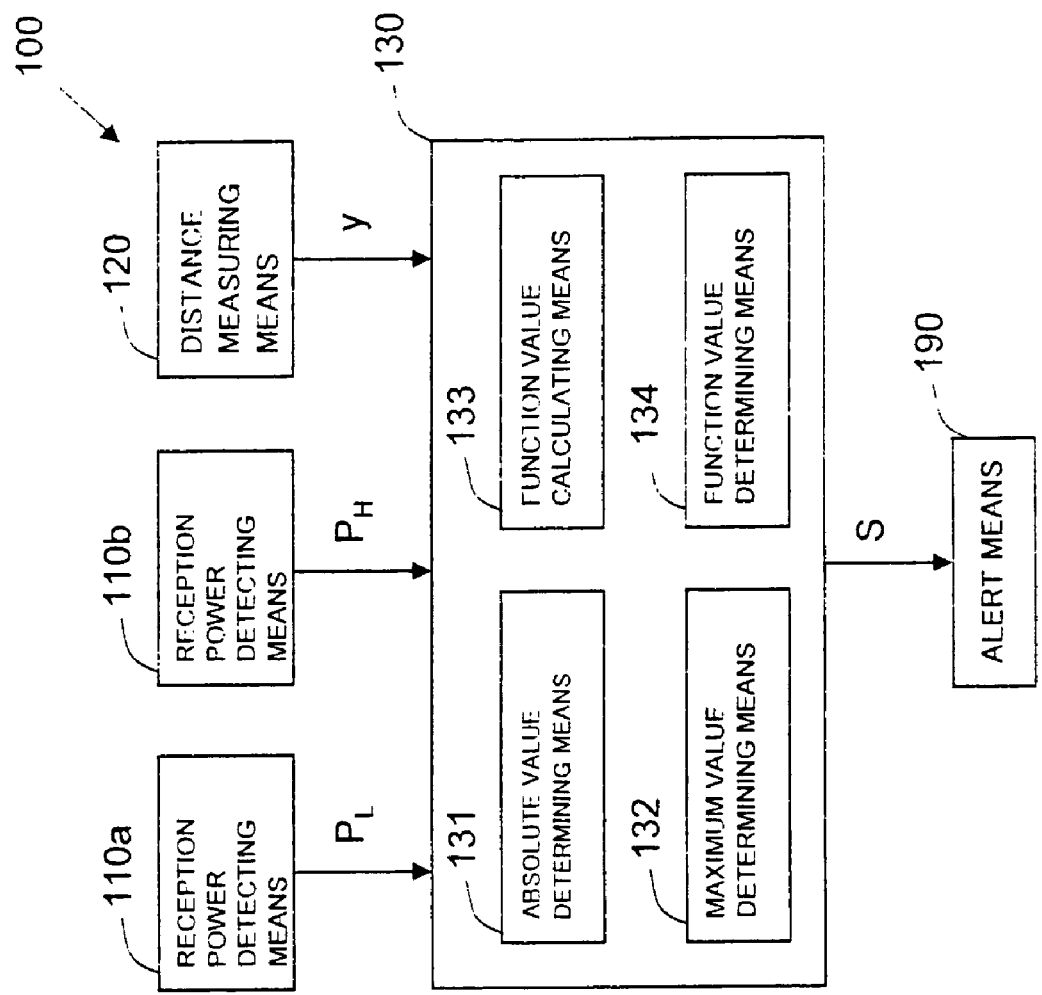
FIG. 8 is a block diagram showing an example of the theoretical configuration of a safety assistance apparatus including a positional relationship determining unit, in the mobile radio communication system in FIG. 6.

A receiving antenna 21 of the receiving station 20 has a mounting height of 0.5 m and a receiving antenna 22 thereof has a mounting height of 1.8 m. The reception signal received by the receiving antennas 21 and 22 are supplied to a safety assistance apparatus 100 in the receiving station 20. FIG. 8 is a block diagram showing an example of the theoretical configuration of the safety assistance apparatus 100 according to the first embodiment of the present invention. Referring to FIG. 8, reception power detecting means 110a demodulates a reception signal received through the receiving antenna 21, performs analog-to-digital (A/D) conversion to the reception signal, and supplies the reception power level $P_L$ of the reception signal to a positional relationship determining unit 130. Similarly, reception power detecting means 110b demodulates a reception signal received through the receiving antenna 22, performs the analog-to-digital (A/D) conversion to the reception signal, and supplies the reception power level $P_H$ of the reception signal to the positional relationship determining unit 130.

The positional relationship determining unit 130 in the safety assistance apparatus 100 is a computer, such as a microcomputer. Specifically and physically, the positional relationship determining unit 130 includes a central processing unit (CPU), a read only memory (ROM), a random access memory (RAM), and an input-output interface. Absolute value determining means 131, maximum value determining means 132, function value calculating means 133, and function value determining means 134 according to the first embodiment of the present invention are realized by a program 200, described below with reference to FIG. 9, executed by the computer.

The absolute value determining means 131 determines whether the absolute value of the difference between the reception power level $P_H$ and the reception power level $P_L$ is lower than a predetermined threshold value Th1 (first power threshold value). The first power threshold value Th1 corresponds to the difference between the reception power level $P_H$ and the reception power level $P_L$ at the deviation point (z=$B_P$) in FIG. 1. For example, the first power threshold value Th1 is around 9 dB in FIG. 1.

The maximum value determining means 132 receives the reception power level $P_H$ and the reception power level $P_L$ and selects the reception power level $P_H$ or the reception power level $P_L$ that is not lower than the other to determine whether the selected reception power level $P_H$ or $P_L$ is higher than or equal to a predetermined threshold value Th2 (second power threshold value). The maximum value determining means 132 corresponds to selection value determining means. The second power threshold value Th2 indicates the level represented by the line segment a in FIG. 1. For example, the second power threshold value Th2 is around −78 dBm in FIG. 1.

Figure 4:
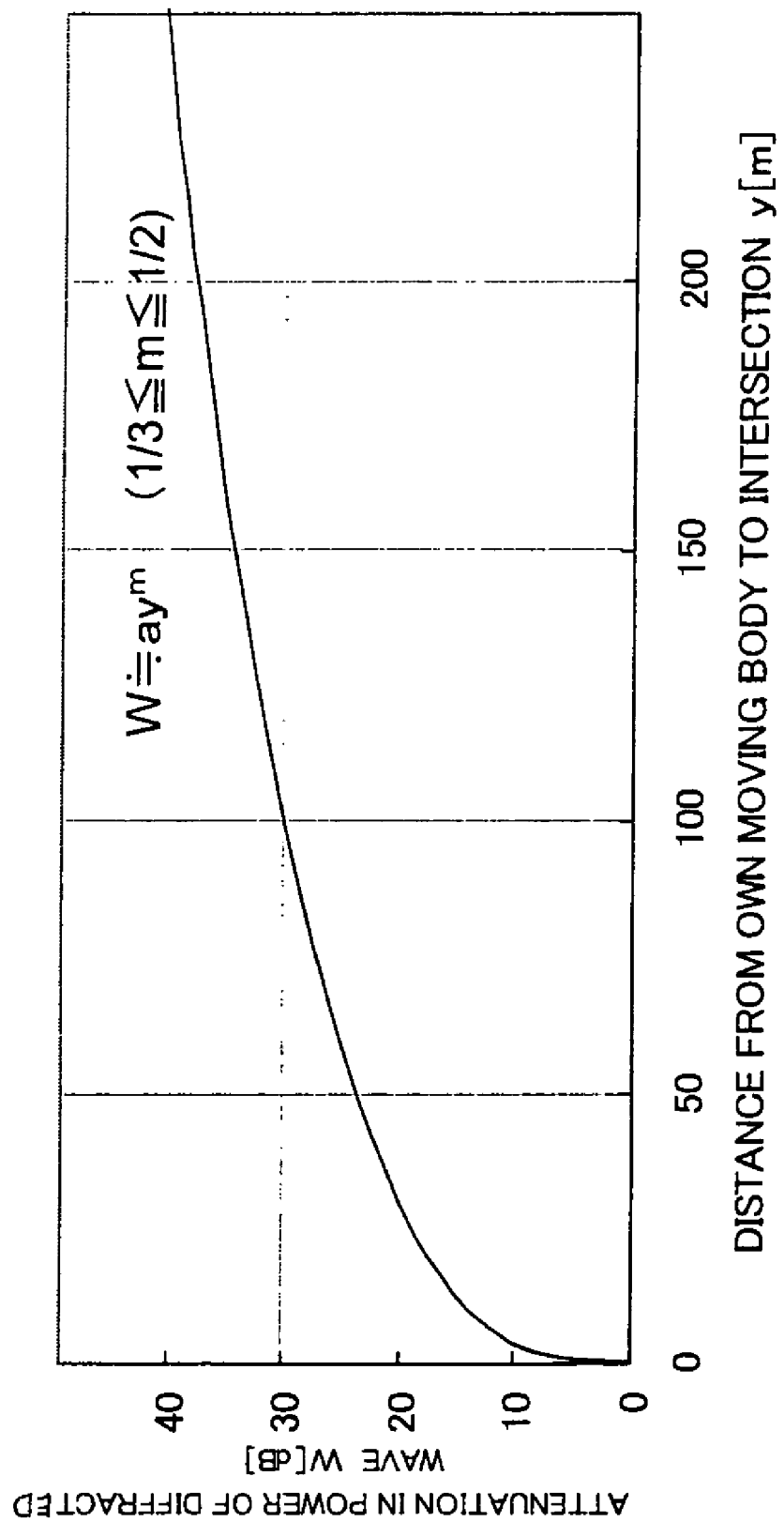
FIG. 4 is a graph showing an example of attenuation in power of a diffracted wave with respect to the distance to an intersection.

The function value calculating means 133 estimates the reception power level of the transmission signal at a target intersection ahead of the own moving terminal (the receiving station 20) when it is assumed that another moving terminal (the transmitting station 10) is positioned in a blind spot on the road intersecting with the road on which the own moving terminal (the receiving station 20) is running. For example, when a distance y from the own moving terminal (the receiving station 20) to the intersection is known, the estimated value (the function value B) can be calculated according to Equation (2). The right side of Equation (2) indicates a power evaluation function according to an embodiment of the present invention and the left side thereof indicates the value of the function.

$$B = P_H + w(y) \qquad (2)$$

where the function value B denotes the estimated value for the reception power level at the intersection by the receiving antenna 22, and the amount of increase w(y) denotes the function value that can be read out from the graph in FIG. 4. The distance y to the intersection ahead of the own moving terminal (the receiving station 20) is measured by distance measuring means 120 in the safety assistance apparatus 100. The distance measuring means 120 includes a car navigation system provided with, for example, the GPS and outputs the distance y from the own moving terminal to the intersection ahead of the own body (receiving station 20), as needed. The output value is within a range from 50 m to 350 m.

The function value determining means 134 determines whether the function value B is higher than or equal to a predetermined threshold value Th3 (third power threshold value). The third power threshold value Th3 indicates the level represented by the line segment b in FIG. 1. For example, the third power threshold value Th3 is around −67 dBm in FIG. 1.

Alert means 190 in FIG. 8 alerts the driver of the own moving terminal (the receiving station 20) to information, for example, the probability of the own moving terminal meeting another moving terminal at the intersection. The alert means 190 operates in accordance with the value of a state signal S output from the positional relationship determining unit 130.

Figure 9:
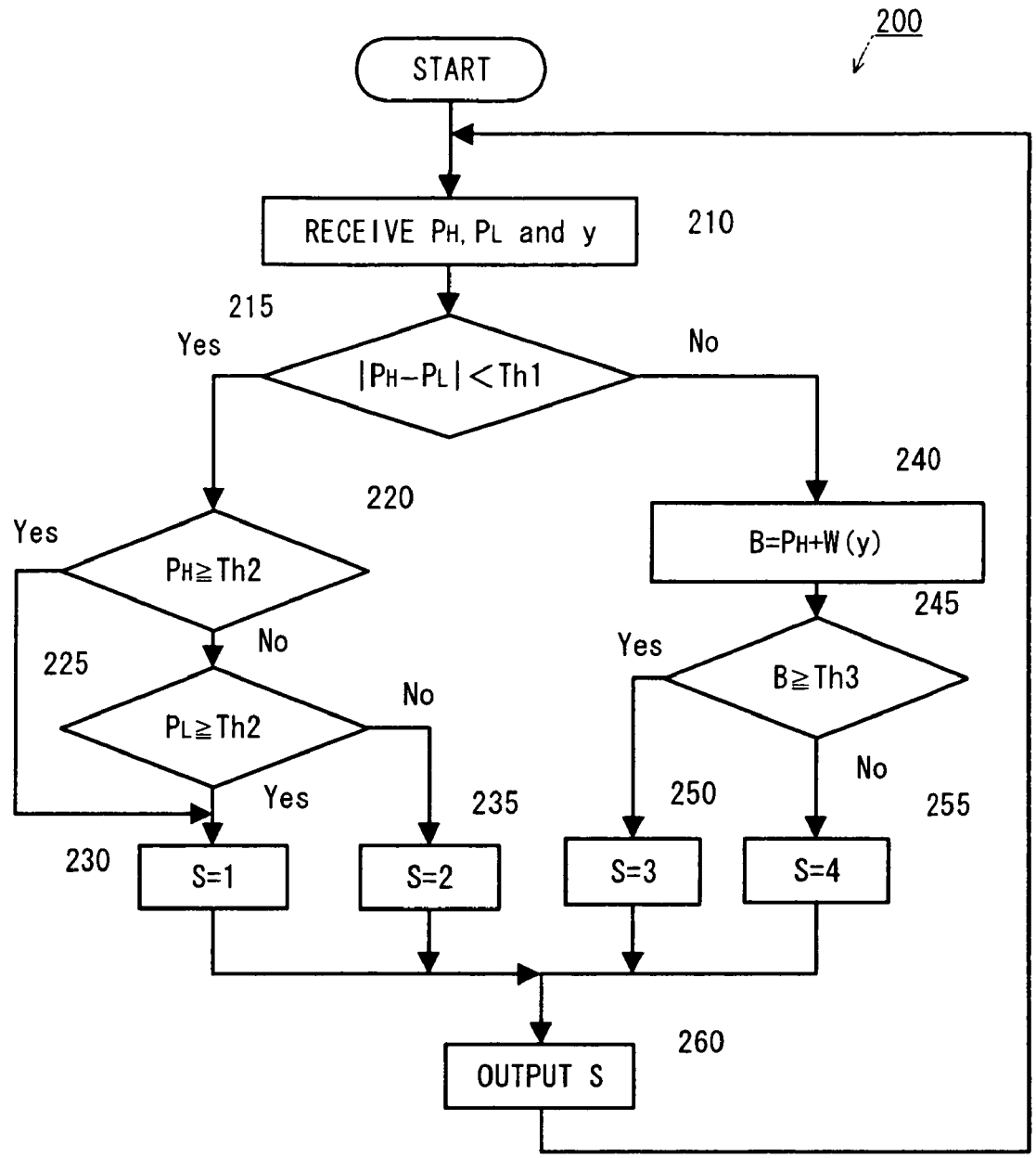
FIG. 9 is a flowchart showing exemplary steps of a program executed by the positional relationship determining unit.

FIG. 9 is a flowchart showing exemplary steps of the program 200 executed by the positional relationship determining unit 130. The program 200 in this flowchart embodies the absolute value determining means 131, the maximum value determining means 132, the function value calculating means 133, and the function value determining means 134 in the positional relationship determining unit 130. Referring to FIG. 9, in Step 210, the program 200 receives the reception power level $P_H$ and the reception power level $P_L$ of the receiving antennas 22 and 21 and the distance y to the intersection ahead of the own moving terminal on the road on which the own device is running from the reception power detecting means 110a, the reception power detecting means 110b, and the distance measuring means 120, respectively.

In Step 215, the program 200 determines whether the absolute value of the difference between the reception power level $P_H$ and the reception power level $P_L$ is lower than the first power threshold value Th1 ($|P_H - P_L| <$ Th1). If the program 200 determines that $|P_H - P_L| <$ Th1, the program 200 goes to Step 220. Otherwise, the program 200 goes to Step 240. Step 215 corresponds to the absolute value determining means 131.

In Step 220, the program 200 determines whether the reception power level $P_H$ of the receiving antenna 22 is higher than or equal to the second power threshold value Th2 ($P_H \geq$ Th2). If the program 200 determines that $P_H \geq$ Th2, the program 200 goes to Step 230. Otherwise, the program 200 goes to Step 225. In Step 225, the program 200 determines whether the reception power level $P_L$ of the receiving antenna 21 is higher than or equal to the second power threshold value Th2 ($P_L \geq$ Th2). If the program 200 determines that $P_L \geq$ Th2, the program 200 goes to Step 230. Otherwise, the program 200 goes to Step 235. Steps 220 and 225 correspond to the maximum value determining means 132.

In Step 230, the program 200 sets the value of the state signal S to be output to one. When the value of the state signal S is equal to one, the positional relationship 1 described above is active. Specifically, in this case, as shown in the example in FIG. 3, it is estimated that another moving terminal is positioned within the visual range of the own moving terminal and the distance z from the own moving terminal to the other moving terminal is shorter than the predetermined distance $B_P$ ($\cong$ 232 m).

In Step 235, the program 200 sets the value of the state signal S to be output to two. When the value of the state signal S is equal to two, the positional relationship 2 described above is active. Specifically, in this case, as shown in the example in FIG. 3, it is estimated that another moving terminal is positioned outside the visual range of the own moving terminal and the distance x to the visual range of the own moving terminal is shorter than the predetermined distance $B_P$.

If the program 200 determines in Step 215 that the absolute value of the difference between the reception power level $P_H$ and the reception power level $P_L$ is higher than or equal to the first power threshold value Th1 ($|P_H - P_L| \geq$ Th1), the following process is performed. Specifically, in Step 240, the program 200 estimates the reception power level B of the transmission signal transmitted from another moving terminal (the transmitting station 10) at the intersection ahead of the own moving terminal according to Equation (2). The reception power level B is the value on the assumption that the other moving terminal (the transmitting station 10) is on the crossroad in the blind spot. Step 240 corresponds to the function value calculating means 133.

In Step 245, the program 200 determines whether the function value B is higher than or equal to the third power threshold value Th3 (B $\geq$ Th3). If the program 200 determines that B $\geq$ Th3, the program 200 goes to Step 250. Otherwise, the program 200 goes to Step 255. Step 245 corresponds to the function value determining means 134.

Figure 5:
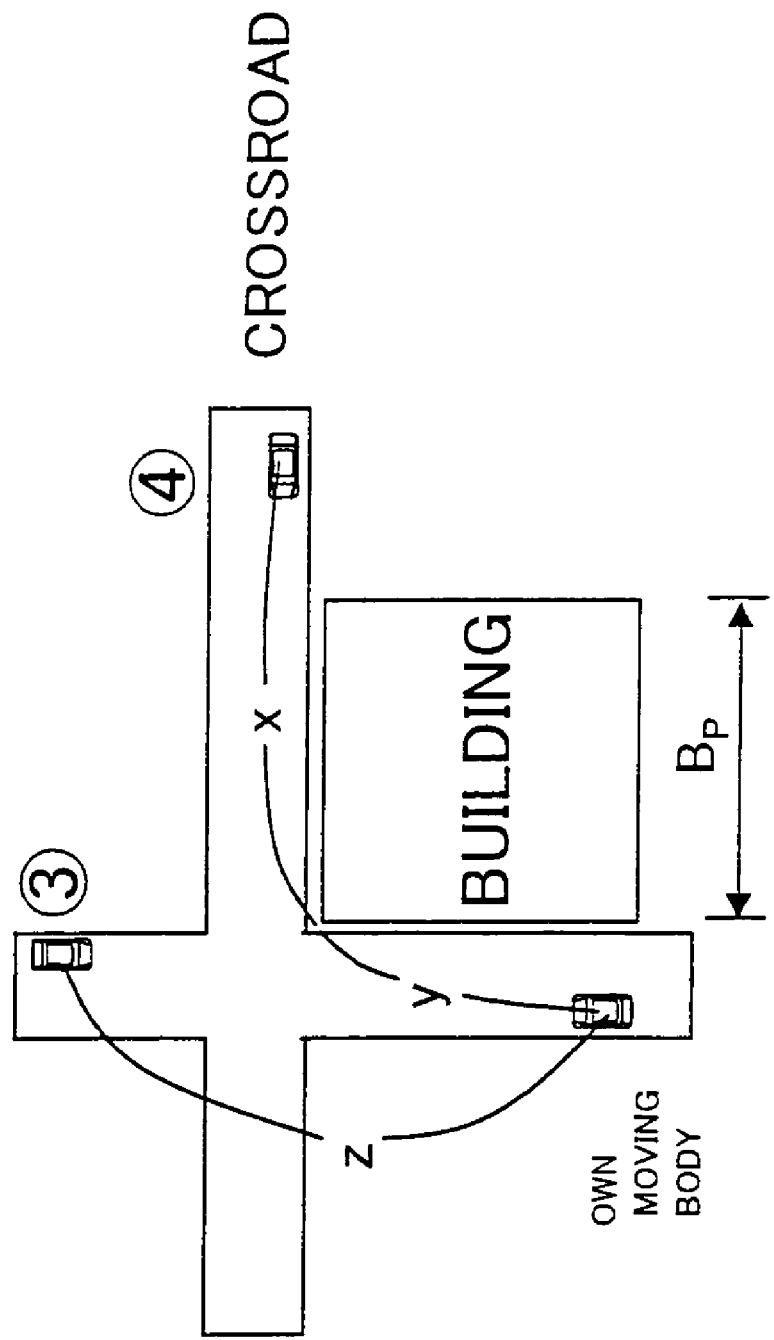
FIG. 5 illustrates other examples of the positional relationship between an own moving terminal and another moving terminal around a view obstruction.

In Step 250, the program 200 sets the value of the state signal S to be output to three. When the value of the state signal S is equal to three, the positional relationship 3 described above is active. Specifically, in this case, as shown in the example in FIG. 5, it is estimated that another moving terminal is positioned within the visual range of the own moving terminal and the distance z from the own moving terminal to the other moving terminal is longer than or equal to the predetermined distance $B_P$.

In Step 255, the program 200 sets the value of the state signal S to be output to four. When the value of the state signal S is equal to four, the positional relationship 4 described above is active. Specifically, in this case, as shown in the example in FIG. 5, it is estimated that another moving terminal is positioned outside the visual range of the own moving terminal and the distance x to the visual range of the own moving terminal is longer than or equal to the predetermined distance $B_P$.

After Step 230, 235, 250, or 255, then in Step 260, the program 200 supplies the state signal S to the alert means 190 in FIG. 8. The alert means 190, which receives the state signal S, outputs an alarm tone only if S=2. The alert means 190 may output the alarm tone only if S=2 is continuously reported on the cycle T at least a predetermined number of times.

After the steps described above are completed, the program 200 periodically repeats the above steps on a predetermined control cycle.

Mounting the safety assistance apparatus 100 operating in the above manner in the receiving station 20 (the own moving terminal) allows the driver of the own moving terminal to know that the transmitting station 10 (another moving terminal) enters the intersection ahead of the own moving terminal by the alarm tone.

Figure 1:
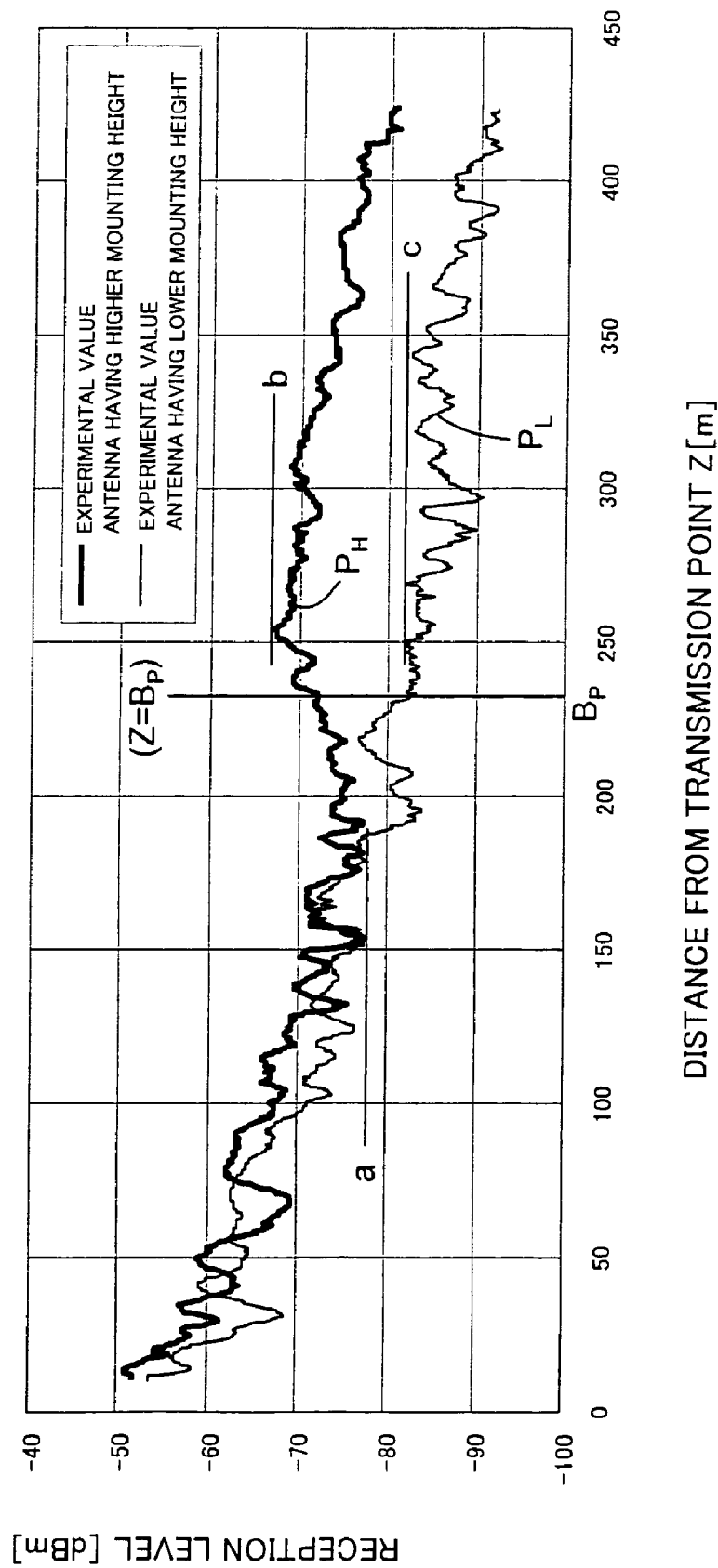
FIG. 1 is a graph showing experimental values of the reception power levels of two antennas having higher and lower mounting heights (in communication within the visual range)
Figure 2:
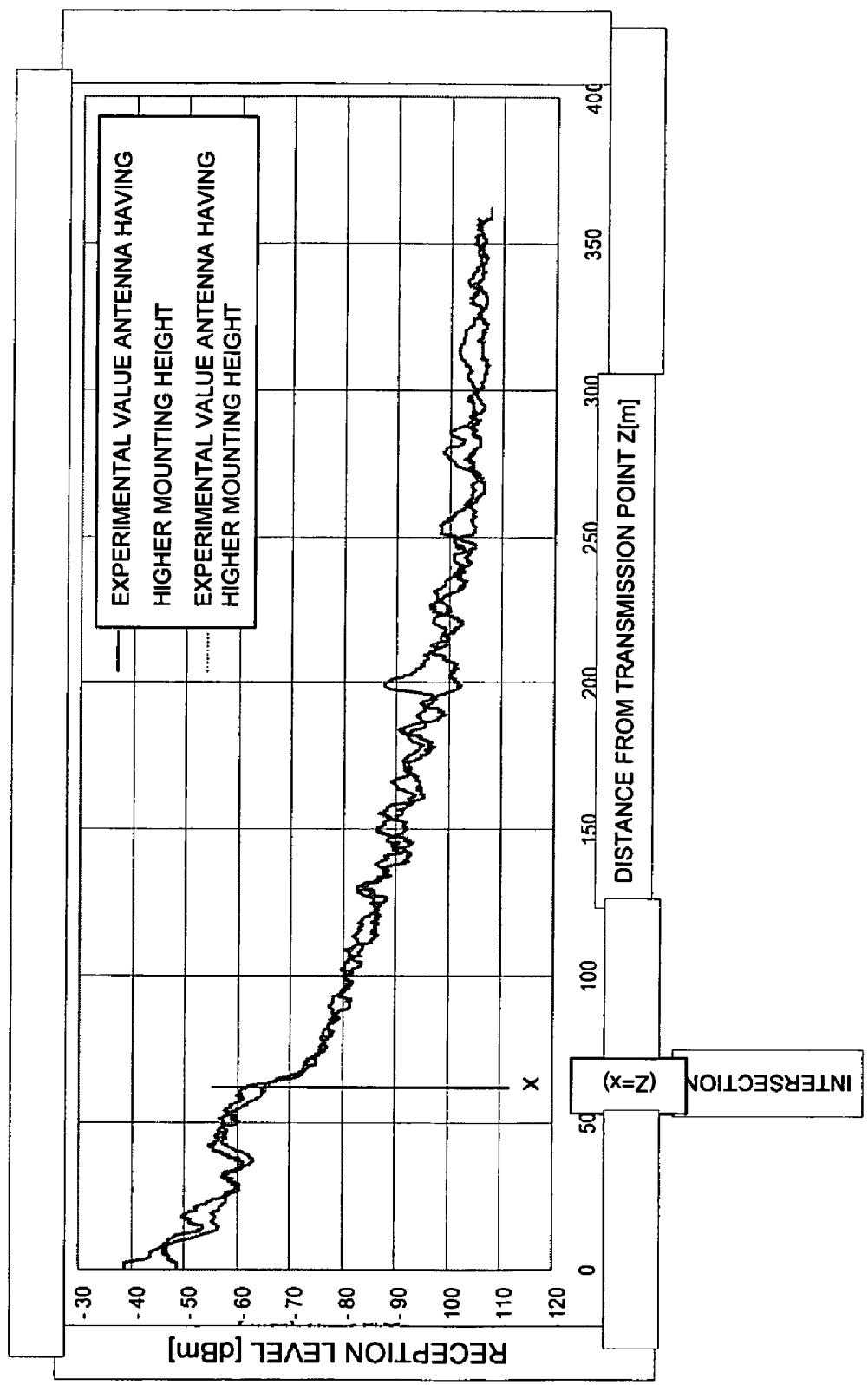
FIG. 2 is a graph showing experimental values of the reception power levels of two antennas having higher and lower mounting heights (in communication across the visual range)
Figure 10:
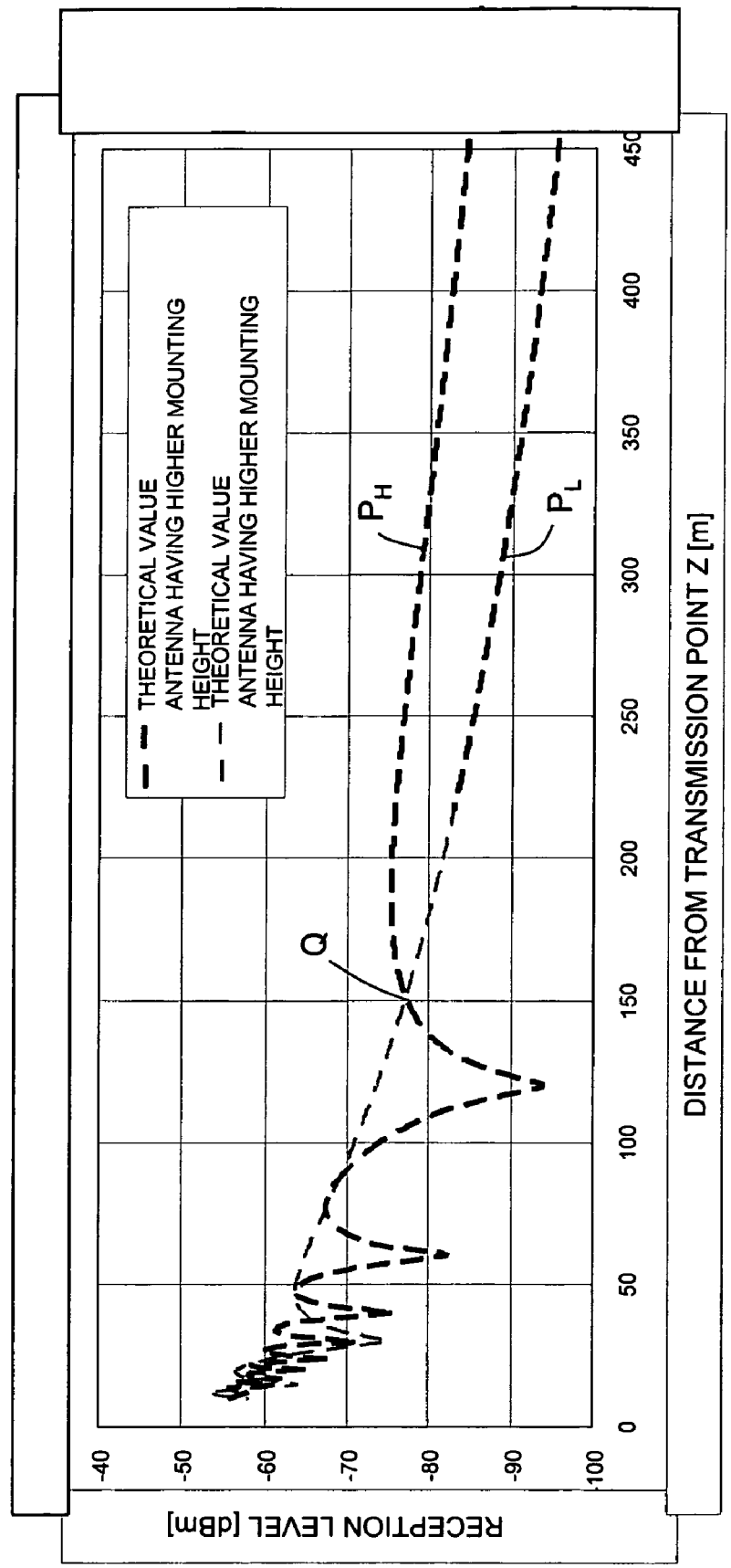
FIG. 10 is a graph showing examples of the reception power levels (theoretical values) in a plane earth propagation model in related art.

Although the second power threshold value Th2 is empirically acquired on the basis of the experimental values in FIG. 1, the second power threshold value Th2 may be theoretically acquired by using a plane earth propagation model. FIG. 10 is a graph showing examples of the reception power levels (theoretical values) in the plane earth propagation model in the related art. The theoretical value of the predetermined distance $B_P$ at the deviation point is around 214 m according to Equation (2). In contrast, when the reception power level at an intersection point Q is adopted as the second power threshold value Th2, the predetermined distance $B_P$ is approximately equal to the reception power level (about −78 dBm) represented by the ling segment a in FIG. 1. Here the intersection point Q (near z=150 m in FIG. 10) is closest to the deviation point (z=$B_P$), among the intersection points where the graph of the reception power level $P_H$ of the reception antenna having the higher mounting height intersects with the graph of the reception power level $P_L$ of the reception antenna having the lower mounting height and the graphs can be calculated by using the plane earth propagation model. In other words, the intersection point Q can be determined to specify the second power threshold value Th2.

Although the reception power level $P_H$ of the reception antenna having the higher mounting height is theoretically lower than the reception power level at the intersection point Q near z=60 m and z=120 m in FIG. 10, the reception power level $P_H$ is not actually lower than the reception power level at the intersection point Q, as shown in the example in FIG. 1. This is because the transmission and reception frequency that is uniquely set is used to perform the calculation in the above model while a slight variation in the frequency of the electromagnetic waves, varied boundary values concerning the transmission path, diffused reflection, delay, and phase shift are possibly involved in the actual measurement environment.

Figure 11:
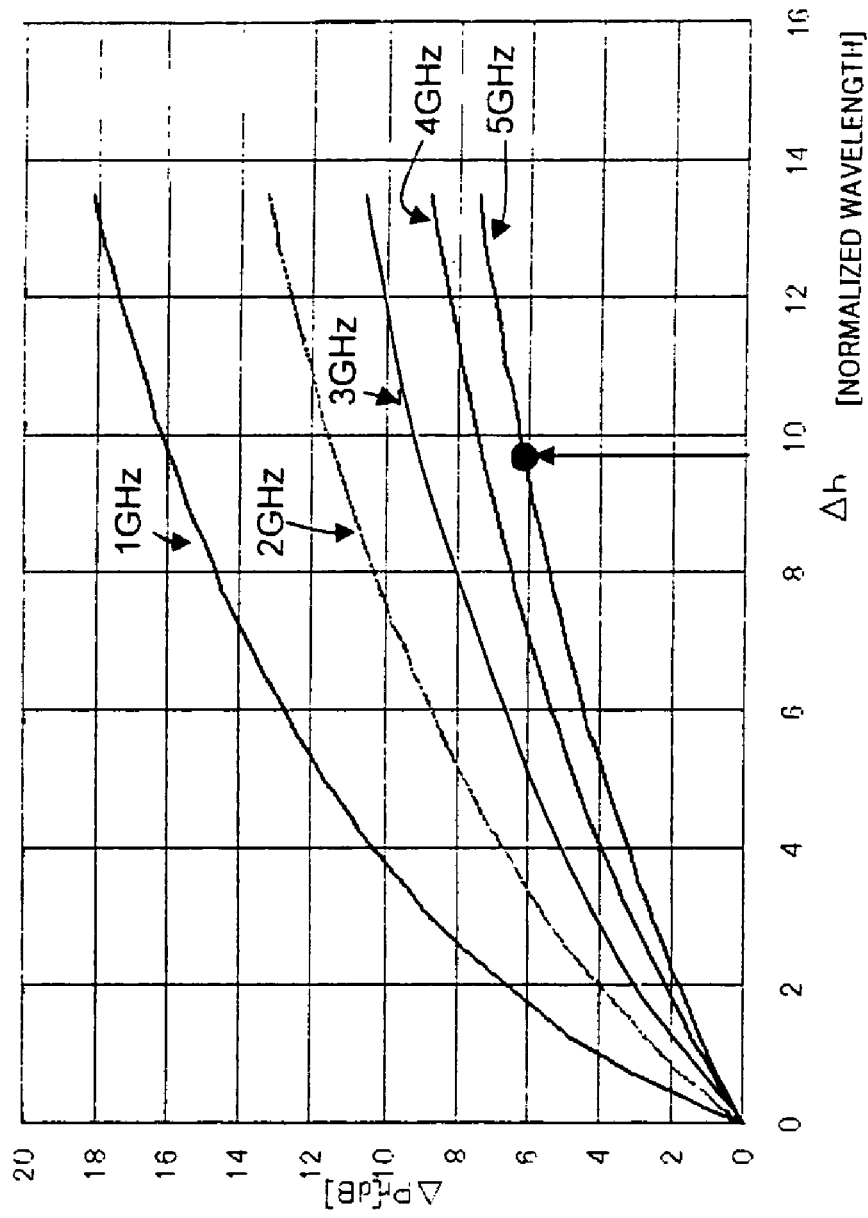
FIG. 11 is a graph showing examples of a difference $\Delta Pr$ in reception power calculated with respect to a difference $\Delta h$ in mounting height between the reception antennas.

The lower limit of a difference Δh in the mounting height between the reception antennas will now be described. FIG. 11 is a graph showing examples of a difference ΔPr in reception power between the reception antennas having the higher and lower mounting heights, which can be calculated in the communication within the visual range having a communication distance of 300 m, with respect to the difference Δh in the mounting height between the reception antennas. Referring to FIG. 11, the mounting height Ah on the horizontal axis was calculated by using one wavelength of the electromagnetic wave as one unit. It is assumed in the estimation of the graph in FIG. 11 that the transmission antenna has a mounting height of 1.8 m and the reception antenna of the lower mounting height has a mounting height of 0.5 m on the basis of the plane earth propagation model in the related art.

The graph in FIG. 11 shows that the difference Δh in mounting height between the reception antennas must be greater than the amount corresponding to about 9.5 wavelengths (about 57 cm) in order to set the difference ΔPr in reception power between the reception antennas having the higher and lower mounting heights for the transmission signal (5 GHz and +10 dBm) output through the transmission antenna of the transmitting station (another moving terminal) apart from the own moving terminal, for example, by 300 m to a value of 6 dB or higher. In such a case, the higher mounting height of the reception antenna must be set to about 1.1 m.

Although the receiving station 20 has the only two receiving antennas 21 and 22 according to the first embodiment of the present invention described above, the receiving station 20 may have three or four antennas. It is possible to configure the mobile radio communication system equivalent to the one according to the first embodiment of the present invention as long as the receiving station 20 has at least two reception antennas.

Second Embodiment

The absolute value determining means 131 can be used to determine and detect the states A and B described above. However, monitoring the transition from the state B to the state A of another moving terminal (the transmitting station 10) permits determination of whether the transmitting station 10 transits from the state B to the positional relationship 1 in FIG. 3 or whether the transmitting station 10 transits from the state B to the positional relationship 2 in FIG. 3 on the basis of the reception power level of at least one of the receiving antennas 21 and 22 or on the basis of the value resulting from weighted average of the reception power levels of both the reception antennas immediately before or after the state transition.

(State A) Another moving terminal is positioned within the visual range of the own moving terminal, the distance from the own moving terminal to the other moving terminal being shorter than the predetermined distance $B_P$, or is positioned outside the visual range of the own moving terminal, the distance to the visual range of the own moving terminal being shorter than the predetermined distance $B_P$.

(State B) Another moving terminal is positioned within the visual range of the own moving terminal, the distance from the own moving terminal to the other moving terminal being longer than or equal to the predetermined distance $B_P$, or is positioned outside the visual range of the own moving terminal, the distance to the visual range of the own moving terminal being longer than or equal to the predetermined distance $B_P$.

The method of determining the state transition described above will now be described in detail with reference to FIG. 12. In positional relationship 5 in FIG. 12, the own moving terminal (the receiving station 20) opposes another moving terminal (the transmitting station 10) across an intersection. The distance z between the own moving terminal and the other moving terminal is equal to the predetermined distance $B_P$ described above. In other words, the receiving station 20 is on the deviation point of the transmitting station 10, and the average of the reception power levels of the receiving antennas 21 and 22 in the receiving station 20 at this timing (z=$B_P$) can be estimated from known reception characteristics, such as the graph shown in FIG. 1. In the example in FIG. 1, the average (the estimated value) is around −77 dBm. Accordingly, the average of the reception power levels of the receiving antennas 21 and 22 is calculated at the time when the state transition from the state B to the state A is detected. It can be determined that the other moving terminal is within the visual range of the own moving terminal if the calculated average is near the estimated value.

Figure 12:
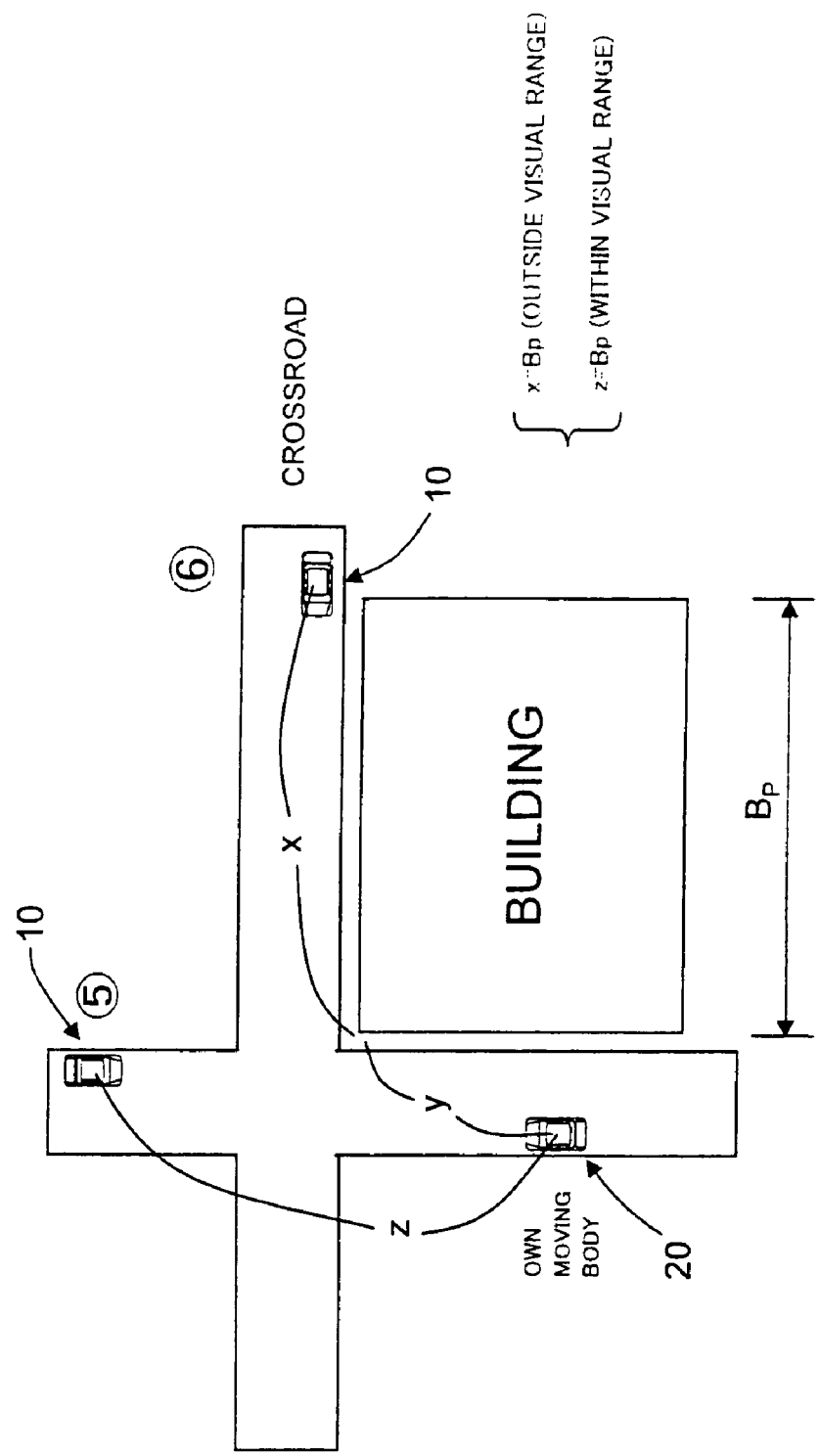
FIG. 12 illustrates examples of positional relationships according to a second embodiment of the present invention.

In contrast, the transmitting station 10 running outside the visual range of the own moving terminal transits from the state B to the state A when the transmitting station 10 approaches positional relationship 6 shown in FIG. 12. In this case, the state transition from the state B to the state A is detected when the distance x to the intersection from the transmitting station 10, which is running on the road intersecting with the road on which the own moving terminal is running and which is across a building (a view obstruction) on the intersection, is decreased to the predetermined distance $B_P$, independent of the value of the distance y (>0 m) from the own moving terminal to the intersection. If y≧50 m when the graphs shown in FIGS. 1 and 4 can be applied, the average of the reception power levels of the receiving antennas 21 and 22 is apparently lower than the estimated value (around −77 dBm) because −w(y)≦−100 dBm.

Accordingly, continuous monitoring of the state transition from the state B to the state A and the reception power level at the state transition for each another moving terminal can detect another moving terminal that transits from the state B to the positional relationship 2.

Figure 3:
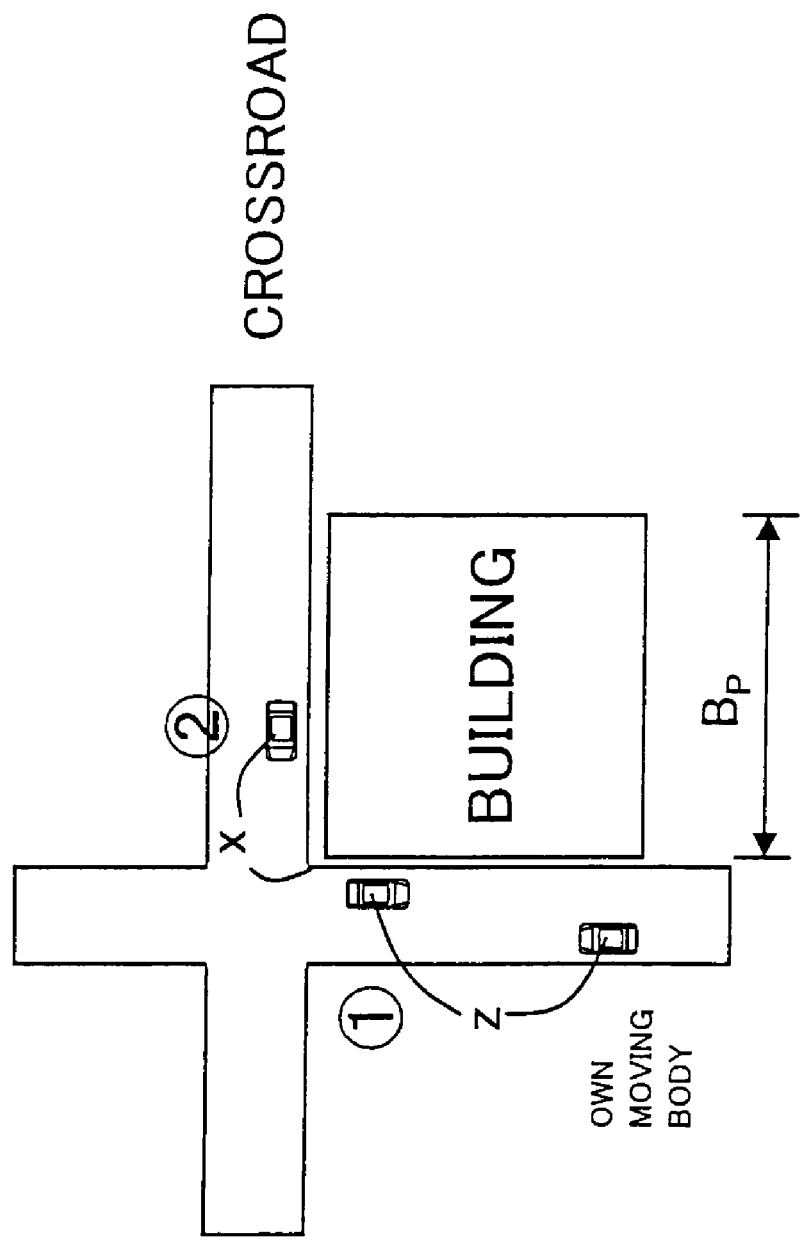
FIG. 3 illustrates examples of the positional relationship between an own moving terminal and another moving terminal around a view obstruction.

In the state transition from the state B to the positional relationship 2, continuous monitoring of the transmission signal from the transmitting station 10 on the cycle T in FIG. 7 can predict approach or entrance of another moving terminal in the positional relationship 2 in FIG. 3 to the intersection. An alarm tone corresponding to the risk can be varied stepwise and output each time the average of the reception power levels of the reception antennas reaches −95 dBm, −90 dBm, or −85 dBm to realize the effective safety driving assistance with the alarm tone.

Since the reception power levels are specifically determined on the basis of the graphs in FIGS. 1 and 4 representing specific experimental results, the reception power levels can be appropriately determined on the basis of the specifications of each mobile radio communication system to be built. The average of the reception power levels is not necessarily fixed to the above value (−95 dBm, −90 dBm, or −85 dBm). In addition, it is not necessary to set the reception power levels at regular intervals or to three or four steps. The reception power levels can be arbitrarily set. In the determination of the reception power levels, a theoretical graph based on, for example, the plane earth propagation model shown in FIG. 10 or the value of another function approximately representing the transmission characteristics between the transmission point and the reception point may be used.

The setting or adjustment of the reception power levels may be arbitrarily performed by the end user. The alarm tone may be continuously varied, instead of varying the alarm tone stepwise. Alternatively, the alarm tone may be appropriately output in accordance with how the distance x from another moving terminal (the transmitting station 10) that is estimated to the intersection is decreased, how the distance y from the own moving terminal to the intersection is decreased, or how the sum of the distances (x+y) is decreased. An alarm message may be output, instead of the alarm tone.

The method of calculating the distance x and so on will be described in detail in a third embodiment of the present invention described below.

Third Embodiment

Figure 13:
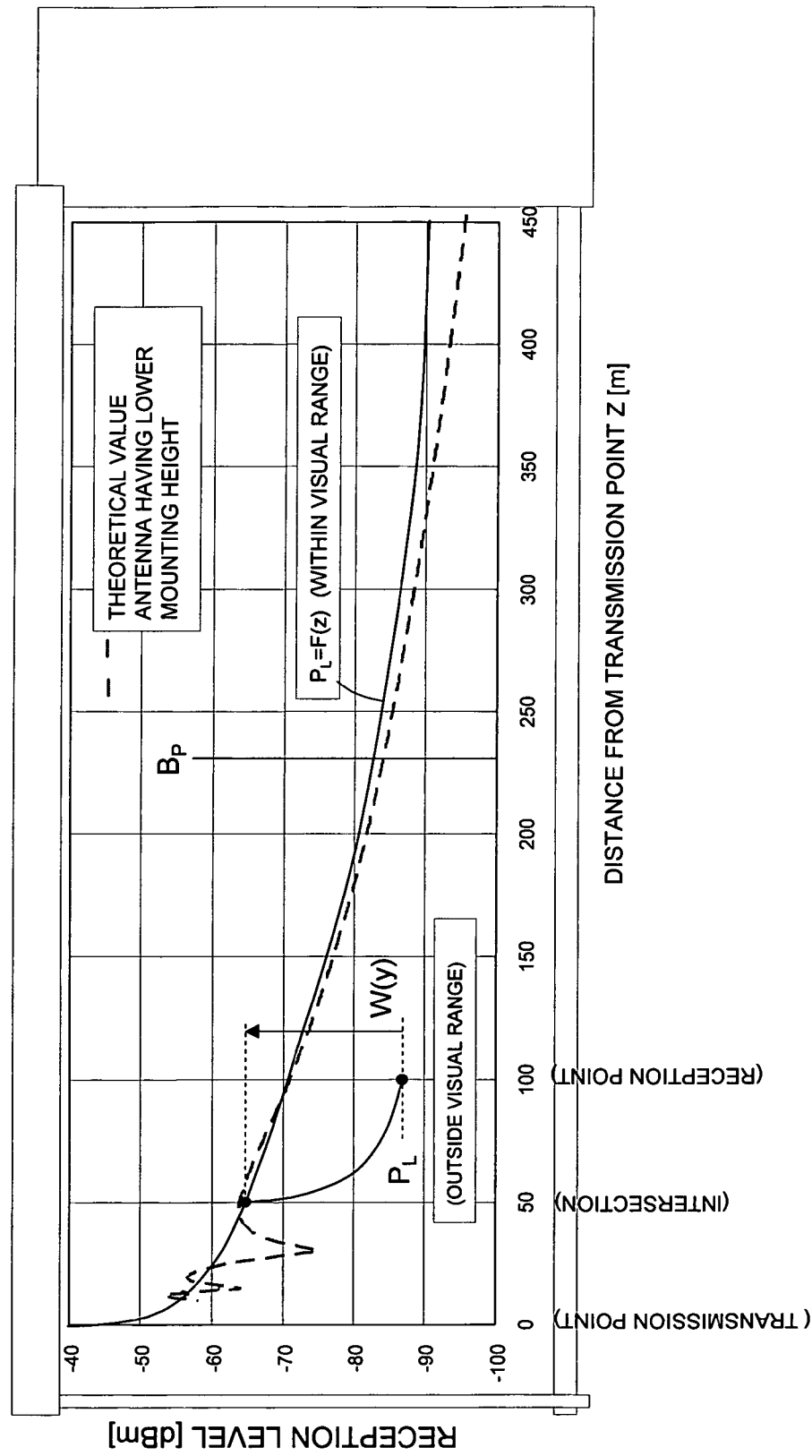
FIG. 13 is a graph showing an exemplary function ($P_L$=F(z)) according to a third embodiment of the present invention.

FIG. 13 is a graph showing an exemplary function ($P_L$= F(z)) according to the third embodiment of the present invention. The function F uses the distance z from the transmitting station 10 to the receiving station 20 as an independent variable and approximates the reception power level $P_L$ (FIG. 1) of the transmission signal received by the receiving antenna 21 having the lower mounting height to a strict monotone decreasing function of the distance z in the communication within the visual range. The reception power level $P_L$ is selected, instead of the reception power level $P_H$, because the reception power level $P_L$ can be approximated to the strict monotone function and, therefore, an inverse function $F^{-1}$ can be defined.

If the state transition from the state B to the positional relationship 2 in FIG. 3 occurs in the second embodiment of the present invention, the communication with another moving terminal (the transmitting station 10) across the visual range will be continued until the own moving terminal meets the other moving terminal at the intersection during the continuous monitoring of the other moving terminal. Accordingly, the distance x from the other moving terminal to the intersection is calculated according to Equation (3).

$$x = F^{-1}(P_L + w(y)) \quad (3)$$

where $P_L$ denotes the reception power level of the receiving antenna 21, the function w(y) denotes the attenuation in power of the diffracted wave defined in FIG. 4, and the distance y denotes the value output from the distance measuring means 120 in FIG. 8. Accordingly, for example, in the example in FIG. 13, the distance x from the other moving terminal (the transmitting station 10) to the intersection is about 50 m.

Since the approximation of the reception power level $P_L$ with the monotone decreasing function F of the distance z in the above manner can easily provide the inverse function $F^{-1}$, it is possible to easily calculate the distance x from the other moving terminal (the transmitting station 10) to the intersection. Accordingly, as described above in the second embodiment of the present invention, the alarm tone may be appropriately output in accordance with how the distance x from another moving terminal (the transmitting station 10) that is estimated to the intersection is decreased, how the distance y from the own moving terminal to the intersection is decreased, or how the sum of the distances (x+y) is decreased.

The comparison between the graph in FIG. 13 and the graph in FIG. 1 shows that the distance x calculated in the above manner varies with the movement of another moving terminal (the transmitting station 10) near the actual value. Accordingly, it is preferred that the distance x be continuously monitored by using, for example, an appropriate low-pass filter.

Fourth Embodiment

According to a fourth embodiment of the present invention, the reception antenna (the own moving terminal) has three reception antennas that are called a reception antenna A, a reception antenna B, and a reception antenna C in the descending order of their mounting heights. In the following description, the distance from the transmitting station (another moving terminal) to the deviation point that can be detected by combining the reception antennas A and B is referred to as a distance $B_{PB}$ in association with the reception antenna B having the lower mounting height and the distance from the transmitting station (the other moving terminal) to the deviation point that can be detected by combining the reception antennas A and C is referred to as a distance $B_{PC}$ in association with the reception antenna C having the lower mounting height.

It is known that the relationship between the distances from the transmitting station to the deviation points is represented by $B_{PC} < P_{PB}$.

Figure 14:
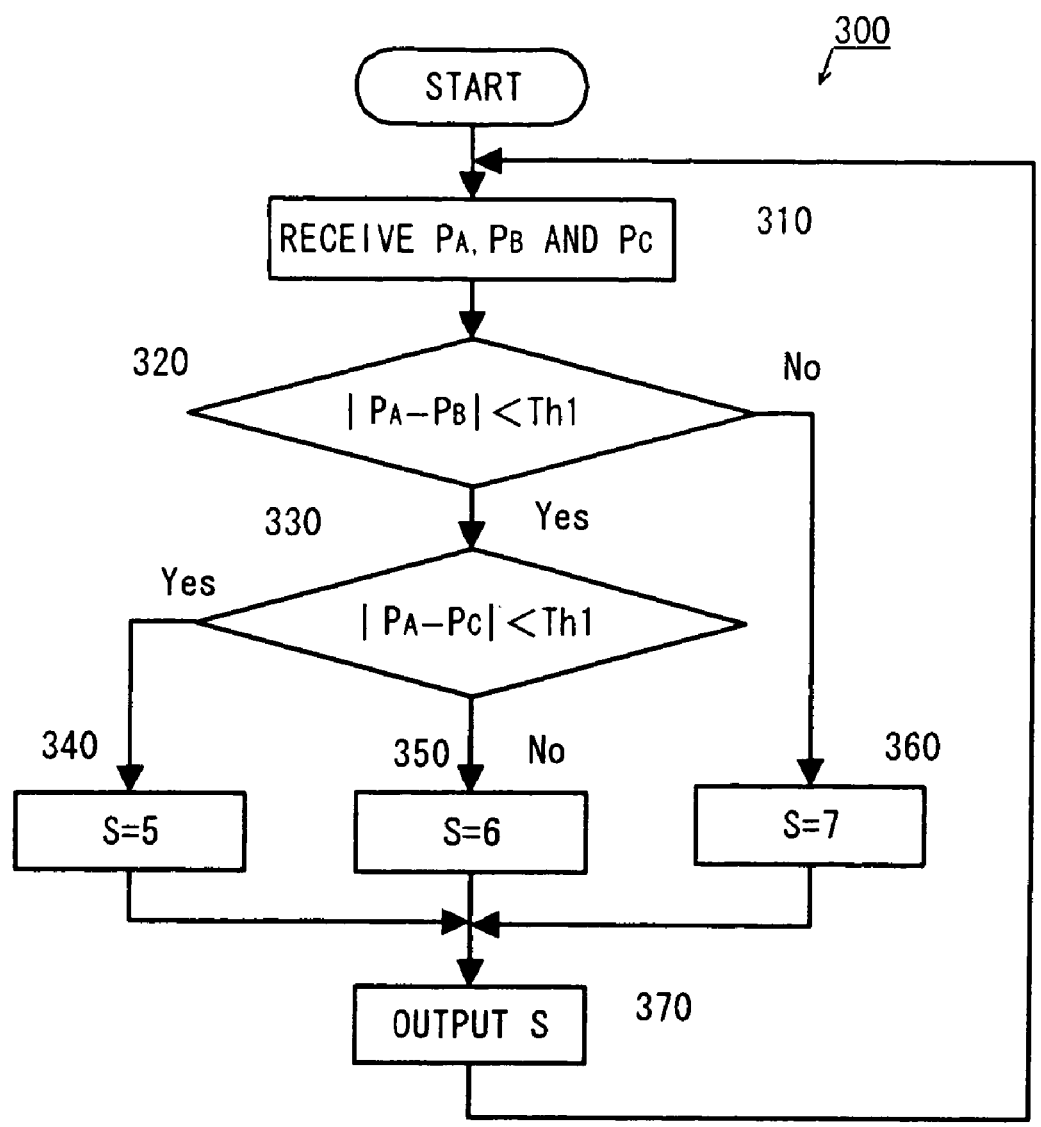
FIG. 14 is a flowchart showing exemplary steps of a program according to a fourth embodiment of the present invention, which is a modification of the first embodiment of the present invention shown in FIG. 9.

FIG. 14 is a flowchart showing exemplary steps of a program 300. The program 300 uses the above characteristics and corresponds to a modification of the first embodiment of the present invention.

Referring to FIG. 14, in Step 310, the program 300 receives the reception power levels $P_A$, $P_B$, and $P_C$ of the reception antennas A, B, and C, respectively. In Step 320, the program 300 determines whether the absolute value of the difference between the reception power levels $P_A$ and $P_B$ is lower than the first power threshold value Th1 ($|P_A-P_B|$<Th1). If the program 300 determines that $|P_A-P_B|$<Th1, the program 300 goes to Step 330. Otherwise, the program 300 goes to Step 360.

In Step 330, the program 300 determines whether the absolute value of the difference between the reception power levels $P_A$ and $P_C$ is lower than the first power threshold value Th1 ($|P_A-P_C|$<Th1). If the program 300 determines that $|P_A-P_C|$<Th1, the program 300 goes to Step 340. Otherwise, the program 300 goes to Step 350.

In Step 340, the program 300 sets the state signal S to five. In Step 350, the program 300 sets the state signal S to six. In Step 360, the program 300 sets the state signal S to seven. In Step 370, the program 300 outputs the state signal S. The values of the state signal S indicate the following states.

(S=5) Another moving terminal is positioned within the visual range of the own moving terminal, the distance from the own moving terminal to the other moving terminal being shorter than the predetermined distance $B_{PC}$, or is positioned outside the visual range of the own moving terminal, the distance to the visual range of the own moving terminal being shorter than the predetermined distance $B_{PC}$.

(S=6) Another moving terminal is positioned within the visual range of the own moving terminal, the distance from the own moving terminal to the other moving terminal being longer than or equal to the predetermined distance $B_{PC}$ and shorter than the predetermined distance $B_{PB}$, or is positioned outside the visual range of the own moving terminal, the distance to the visual range of the own moving terminal being longer than or equal to the predetermined distance $B_{PC}$ and shorter than the predetermined distance $B_{PB}$.

(S=7) Another moving terminal is positioned within the visual range of the own moving terminal, the distance from the own moving terminal to the other moving terminal being longer than or equal to the predetermined distance $B_{PB}$, or is positioned outside the visual range of the own moving terminal, the distance to the visual range of the own moving terminal being longer than or equal to the predetermined distance $B_{PB}$.

Since the above configuration of the mobile radio communication system provides multiple combinations of the reception power levels to calculate the absolute value of the difference, multiple deviation points appear between the transmitting station and the receiving station in accordance with the variation in the combination of two reception antennas (the selection of two reception antennas). Accordingly, the introduction or application of the above program allows the position of another moving terminal with respect to the own moving terminal to be accurately determined on the basis of the positional relationship between each deviation point and the own moving terminal or the other moving terminal.

Fifth Embodiment

If the absolute value determining means 131 in FIG. 8 (or Step 215 in FIG. 9) detects the state A, it may be determined whether another moving terminal is in the positional relationship 1 or in the positional relationship 2 on the basis of the determination according to Equation (4).

$$P1 \leq P_H + w(y) \equiv p \leq P2 \tag{4}$$

where the lower limit P1 and the higher limit P2 denote appropriate threshold values and, for example, (P1, P2) can be set to (−79 dBm, −57 dBm) in FIG. 1. If such a state is continuously detected a predetermined number of times on the cycle T, it can be determined that the other moving terminal (the transmitting station 10) is outside the visual range of the own moving terminal (in the positional relationship 2) to continue the monitoring of the other moving terminal (the transmitting station 10). The above state may be determined on the basis of the determination of whether the average of the lower limit P1 and the higher limit P2 (=(P2+P1)/2) is larger than a predetermined value p0 for the deviation Δp of the values p (=(P2−P2)/2).

The determination on the basis of the same range or deviation may be performed to another moving terminal in the state B. Also in such a case, it can be determined that the other moving terminal (the transmitting station 10) is outside the visual range of the own moving terminal (in the positional relationship 4) to continue the monitoring of the other moving terminal (the transmitting station 10).

MODIFICATIONS

It should be understood by those skilled in the art that various modifications, combinations, sub-combinations and alterations may occur depending on design requirements and other factors insofar as they are within the scope of the appended claims or the equivalents thereof.

First Modification

For example, the transmitting station 10 and the receiving station 20 in FIG. 6 may be mounted in one moving terminal. In this case, it is possible to configure the mobile radio communication system in which the transmitting station 10 can monitor the probability of the transmitting station 10 meeting the receiving station 20 and the receiving station 20 can monitor the probability of the receiving station 20 meeting the transmitting station 10. Even if one moving terminal erroneously determines the probability of the moving terminal meeting another moving terminal at an intersection, it can be expected that the other moving terminal correctly determines the probability. Accordingly, a failsafe mechanism against such erroneous determination can be configured in the mobile radio communication system.

Furthermore, the transmitting antenna 11 may also serve as the receiving antenna 22 in each moving terminal.

The present invention is useful for moving bodies running in an environment in which blind spots are likely to be caused due to, for example, buildings. The present invention is applicable to, for example, a safety assistance system to be provided to ensure traffic safety at, for example, a blind intersection.

What is claimed is:

1. A mobile radio communication system estimating the positional relationship between the own moving terminal and the other moving terminal around a view obstruction, wherein the other moving terminal serves as a transmitting station in the mobile radio communication system and includes a transmission antenna having a predetermined transmission power level and a predetermined mounting height, wherein the own moving terminal serves as a receiving station in the mobile radio communication system and includes two reception antennas having different mounting heights, the mounting height of one reception antenna being different from that of the other reception antenna by a certain value or higher;

reception power level detecting means for detecting the reception power level of a signal transmitted from the transmission antenna of the other moving terminal for every reception antenna; and absolute value determining means for determining whether the absolute value of the difference between the detected reception power levels is lower than a first power threshold value, wherein, if the absolute value is lower than the first power threshold value, the own moving terminal determines that the other moving terminal is positioned within the visual range of the own moving terminal, the distance from the own moving terminal to the other moving terminal being shorter than a predetermined distance $B_P$, or that the other moving terminal is positioned outside the visual range of the own moving terminal, the distance to the visual range of the own moving terminal being shorter than the predetermined distance $B_P$, and wherein, if the absolute value is higher than or equal to the first power threshold value, the own moving terminal determines that the other moving terminal is positioned within the visual range of the own moving terminal, the distance from the own moving terminal to the other moving terminal being longer than or equal to the predetermined distance $B_P$, or that the other moving terminal is positioned outside the visual range of the own moving terminal, the distance to the visual range of the own moving terminal being longer than or equal to the predetermined distance $B_P$.

2. The mobile radio communication system according to claim 1, wherein the own moving terminal further includes selected value determining means for determining whether a value selected from the detected reception power levels is higher than or equal to a second power threshold value, wherein, if the absolute value is lower than the first power threshold value and the selected value is higher than or equal to the second power threshold value, the own moving terminal determines that the other moving terminal is positioned within the visual range of the own moving terminal, the distance from the own moving terminal to the other moving terminal being shorter than the predetermined distance $B_P$, and wherein, if the absolute value is lower than the first power threshold value and the selected value is lower than the second power threshold value, the own moving terminal determines that the other moving terminal is positioned outside the visual range of the own moving terminal, the distance to the visual range of the own moving terminal being shorter than the predetermined distance $B_P$.

3. The mobile radio communication system according to claim 2, wherein the own moving terminal further includes alert means for issuing an alert message or an alert tone if the own moving terminal determines that the other moving terminal is positioned outside the visual range of the own moving terminal, the distance to the visual range of the own moving terminal being shorter than the predetermined distance $B_P$.

4. The mobile radio communication system according to claim 1, wherein the own moving terminal further includes distance measuring means for measuring the distance from the own moving terminal to an intersection ahead of the own moving terminal on the road on which the own moving terminal is running;

function value calculating means for calculating the value of a power evaluation function used for estimating the reception power level at the intersection of the transmission signal which is supposed to be diffracted at the intersection on the basis of a selected value of the detected reception power levels, the distance from the own moving terminal to the intersection, and a predetermined attenuation characteristic of the diffracted electromagnetic wave; and function value determining means for determining whether the value of the power evaluation function is higher than or equal to a third power threshold value, wherein, if the absolute value is higher than or equal to the first power threshold value and the value of the power evaluation function is higher than or equal to the third power threshold value, the own moving terminal determines that the other moving terminal is positioned within the visual range of the own moving terminal, the distance from the own moving terminal to the other moving terminal being longer than or equal to the predetermined distance $B_P$, and wherein, if the absolute value is higher than or equal to the first power threshold value and the value of the power evaluation function is lower than the third power threshold value, the own moving terminal determines that the other moving terminal is positioned outside the visual range of the own moving terminal, the distance to the visual range of the own moving terminal being longer than or equal to the predetermined distance $B_P$.

5. The mobile radio communication system according to claim 1, wherein the own moving terminal includes the transmission antenna.

6. A mobile radio communication system estimating the positional relationship between the own moving terminal and the other moving terminal around a view obstruction, wherein the other moving terminal serves as a transmitting station in the mobile radio communication system and includes a transmission antenna having a predetermined transmission power level and a predetermined mounting height, wherein the own moving terminal serves as a receiving station in the mobile radio communication system and includes three or more reception antennas having different mounting heights;

reception power level detecting means for detecting the reception power level of a signal transmitted from the transmission antenna of the other moving terminal for every reception antenna;

distance storing means for storing a predetermined distances $B_P$ corresponding to each of the reception antennas excluding at least the reception antenna having the highest mounting height; and absolute value determining means for selecting arbitrary two reception antennas from the three or more reception antennas to determine whether the absolute value of the difference between the reception power levels of the selected reception antennas is lower than a first power threshold value, wherein, if the absolute value is lower than the first power threshold value, the own moving terminal determines that the other moving terminal is positioned within the visual range of the own moving terminal, the distance from the own moving terminal to the other moving terminal being shorter than the predetermined distance $B_P$ corresponding to the reception antenna having the lower mounting height among the selected reception antennas, or that the other moving terminal is positioned outside the visual range of the own moving terminal, the distance to the visual range of the own moving terminal being shorter than the predetermined distance $B_P$, and wherein, if the absolute value is higher than or equal to the first power threshold value, the own moving terminal determines that the other moving terminal is positioned within the visual range of the own moving terminal, the distance from the own moving terminal to the other moving terminal being longer than or equal to the predetermined distance $B_P$, or that the other moving terminal is positioned outside the visual range of the own moving terminal, the distance to the visual range of the own moving terminal being longer than or equal to the predetermined distance $B_P$.

7. The mobile radio communication system according to claim 6, wherein the own moving terminal further includes selected value determining means for determining whether a value selected from the detected reception power levels is higher than or equal to a second power threshold value, wherein, if the absolute value is lower than the first power threshold value and the selected value is higher than or equal to the second power threshold value, the own moving terminal determines that the other moving terminal is positioned within the visual range of the own moving terminal, the distance from the own moving terminal to the other moving terminal being shorter than the predetermined distance $B_P$ corresponding to the reception antenna having the lower mounting height among the selected two reception antennas, and wherein, if the absolute value is lower than the first power threshold value and the selected value is lower than the second power threshold value, the own moving terminal determines that the other moving terminal is positioned outside the visual range of the own moving terminal, the distance to the visual range of the own moving terminal being shorter than the predetermined distance $B_P$.

8. The mobile radio communication system according to claim 7, wherein the own moving terminal further includes alert means for issuing an alert message or an alert tone if the own moving terminal determines that the other moving terminal is positioned outside the visual range of the own moving terminal, the distance to the visual range of the own moving terminal being shorter than the predetermined distance $B_P$ corresponding to the reception antenna having the lower mounting height among the selected two reception antennas.

9. The mobile radio communication system according to claim 6, wherein the own moving terminal further includes
    distance measuring means for measuring the distance from the own moving terminal to an intersection ahead of the own moving terminal on the road on which the own moving terminal is running;
    function value calculating means for calculating the value of a power evaluation function used for estimating the reception power level at the intersection of the transmission signal which is supposed to be diffracted at the intersection on the basis of a selected value of the detected reception power levels, the distance from the own moving terminal to the intersection, and a predetermined attenuation characteristic of the diffracted electromagnetic wave; and
    function value determining means for determining whether the value of the power evaluation function is higher than or equal to a third power threshold value, wherein, if the absolute value is higher than or equal to the first power threshold value and the value of the power evaluation function is higher than or equal to the third power threshold value, the own moving terminal determines that the other moving terminal is positioned within the visual range of the own moving terminal, the distance from the own moving terminal to the other moving terminal being longer than or equal to the predetermined distance $B_P$ corresponding to the reception antenna having the lower mounting height among the selected two reception antennas, and wherein, if the absolute value is higher than or equal to the first power threshold value and the value of the power evaluation function is lower than the third power threshold value, the own moving terminal determines that the other moving terminal is positioned outside the visual range of the own moving terminal, the distance to the visual range of the own moving terminal being longer than or equal to the predetermined distance $B_P$.

* * * * *